United States Patent
Guyan et al.

(10) Patent No.: US 10,231,511 B2
(45) Date of Patent: Mar. 19, 2019

(54) INTERWOVEN LATTICE STRUCTURE FOR CUSHIONING MEMBER

(71) Applicant: Under Armour, Inc., Baltimore, MD (US)

(72) Inventors: Alan Guyan, Baltimore, MD (US); John Acevedo, Portland, OR (US); David Dirsa, Portland, OR (US); Kevin Fallon, Portland, OR (US)

(73) Assignee: Under Armour, Inc., Baltimore, MD (US)

( * ) Notice: Subject to any disclaimer, the term of this patent is extended or adjusted under 35 U.S.C. 154(b) by 4 days.

(21) Appl. No.: 15/459,816

(22) Filed: Mar. 15, 2017

(65) Prior Publication Data

US 2017/0181496 A1    Jun. 29, 2017

Related U.S. Application Data

(63) Continuation of application No. 15/148,549, filed on May 6, 2016, now Pat. No. 10,010,134.

(Continued)

(51) Int. Cl.
| | |
|---|---|
| *A43B 13/14* | (2006.01) |
| *A43B 13/18* | (2006.01) |
| *A43B 13/12* | (2006.01) |
| *A43B 3/00* | (2006.01) |
| *A43B 1/00* | (2006.01) |
| *A43B 13/02* | (2006.01) |
| *B33Y 80/00* | (2015.01) |
| *A43B 7/32* | (2006.01) |
| *A43D 999/00* | (2006.01) |

(52) U.S. Cl.
CPC .......... *A43B 13/181* (2013.01); *A43B 1/0009* (2013.01); *A43B 3/0052* (2013.01); *A43B 7/32* (2013.01); *A43B 13/02* (2013.01); *A43B 13/125* (2013.01); *A43B 13/14* (2013.01); *A43B 13/186* (2013.01); *A43D 999/00* (2013.01); *B33Y 80/00* (2014.12)

(58) Field of Classification Search
CPC ........... A43B 1/00; A43B 13/02; A43B 13/14; A43B 13/18
USPC .................... 36/28, 25 R, 30 R, 31
See application file for complete search history.

(56) References Cited

U.S. PATENT DOCUMENTS

| | | |
|---|---|---|
| 1,800,406 A | 4/1931 | Rice |
| 3,469,576 A | 9/1969 | Smith et al. |

(Continued)

FOREIGN PATENT DOCUMENTS

| | | |
|---|---|---|
| AU | 2008207351 | 3/2009 |
| CN | 1190560 | 8/1998 |

(Continued)

*Primary Examiner* — Marie D Bays
(74) *Attorney, Agent, or Firm* — Maginot, Moore & Beck LLP

(57) ABSTRACT

A cushioning member includes a first lattice structure and a second lattice structure. The first lattice structure includes a first network of struts and nodes with voids defined between the struts and nodes. The second lattice structure includes a second network of struts and nodes with voids defined between the struts and nodes. The first network of struts and nodes is interwoven with the second network of struts and nodes such that the first network of struts and nodes extends through the voids in the second network of struts and nodes.

20 Claims, 22 Drawing Sheets

Related U.S. Application Data

(60) Provisional application No. 62/309,286, filed on Mar. 16, 2016, provisional application No. 62/158,950, filed on May 8, 2015.

(56) References Cited

U.S. PATENT DOCUMENTS

| | | |
|---|---|---|
| 4,168,341 A | 9/1979 | Siedenstrang et al. |
| 4,170,078 A | 10/1979 | Moss |
| 4,245,406 A | 1/1981 | Landay |
| 4,297,796 A | 11/1981 | Stirtz et al. |
| 4,316,335 A | 2/1982 | Giese |
| 4,535,553 A | 8/1985 | Derderian et al. |
| 4,546,556 A | 10/1985 | Stubblefield |
| 4,594,799 A | 6/1986 | Lin |
| 4,598,487 A | 7/1986 | Misevich |
| 4,663,865 A | 5/1987 | Telecemian |
| 4,668,557 A | 5/1987 | Lakes |
| 4,769,927 A | 9/1988 | Liggett et al. |
| 4,774,774 A | 10/1988 | Allen |
| 4,845,863 A | 7/1989 | Yung-Mao |
| 4,854,055 A | 8/1989 | Sugiyama |
| 4,863,538 A | 9/1989 | Deckard |
| 4,864,738 A | 9/1989 | Horovitz |
| 4,938,816 A | 7/1990 | Beaman et al. |
| 5,005,575 A | 4/1991 | Geri |
| 5,022,168 A | 6/1991 | Jeppson |
| 5,117,566 A | 6/1992 | Lloyd |
| 5,156,697 A | 10/1992 | Bourell et al. |
| 5,218,773 A | 6/1993 | Beekman |
| 5,231,776 A | 8/1993 | Wagner |
| 5,255,451 A | 10/1993 | Tong |
| 5,261,169 A | 11/1993 | Williford |
| 5,337,492 A | 8/1994 | Anderie et al. |
| 5,348,693 A | 9/1994 | Taylor et al. |
| 5,353,526 A | 10/1994 | Foley |
| 5,367,791 A | 11/1994 | Gross et al. |
| 5,408,761 A | 4/1995 | Gazzano |
| 5,461,800 A | 10/1995 | Luthi et al. |
| 5,465,509 A | 11/1995 | Fuerst et al. |
| 5,511,323 A | 4/1996 | Dahlgren |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,781 A | 11/1997 | Bury |
| 5,771,610 A | 6/1998 | McDonald |
| 5,822,886 A | 10/1998 | Luthi |
| 5,876,767 A | 3/1999 | Mattes et al. |
| 5,896,680 A | 4/1999 | Kim et al. |
| 5,908,569 A | 6/1999 | Wilkening et al. |
| 5,983,524 A | 11/1999 | Polegato |
| 6,006,412 A | 12/1999 | Bergmann et al. |
| 6,029,376 A | 2/2000 | Cass |
| 6,108,943 A | 8/2000 | Hudson et al. |
| 6,110,411 A | 8/2000 | Clausen et al. |
| 6,193,923 B1 | 2/2001 | Leyden et al. |
| 6,205,682 B1 | 3/2001 | Park |
| 6,259,962 B1 | 7/2001 | Gothait |
| 6,360,454 B1 | 3/2002 | Dachgruber et al. |
| 6,367,172 B2 | 4/2002 | Hernandez |
| 6,412,196 B1 | 7/2002 | Gross |
| 6,533,885 B2 | 3/2003 | Davis et al. |
| 6,540,864 B1 | 4/2003 | Chi |
| 6,601,042 B1 | 7/2003 | Lyden |
| 6,601,321 B1 | 8/2003 | Kendall |
| 6,660,209 B2 | 12/2003 | Leyden et al. |
| 6,694,207 B2 | 2/2004 | Darrah et al. |
| 6,763,611 B1 | 7/2004 | Fusco |
| 6,769,202 B1 | 8/2004 | Luthi et al. |
| 6,817,112 B2 | 11/2004 | Berger et al. |
| 6,819,966 B1 | 11/2004 | Haeberli |
| 6,826,852 B2 | 12/2004 | Fusco |
| 7,065,820 B2 | 6/2006 | Meschter |
| 7,077,638 B2 | 7/2006 | Leyden et al. |
| RE39,354 E | 10/2006 | Dickens, Jr. et al. |
| 7,148,286 B2 | 12/2006 | Baumann et al. |
| 7,159,338 B2 | 1/2007 | LeVert |
| 7,207,125 B2 | 4/2007 | Jeppesen |
| 7,291,002 B2 | 11/2007 | Russell et al. |
| 7,350,320 B2 | 4/2008 | Chandler |
| 7,383,647 B2 | 6/2008 | Chan |
| 7,424,783 B2 | 9/2008 | Meschter et al. |
| 7,484,318 B2 | 2/2009 | Finkelstein |
| 7,571,556 B2 | 8/2009 | Hardy et al. |
| 7,707,743 B2 | 5/2010 | Schindler |
| 7,788,827 B2 | 9/2010 | Fogg et al. |
| 7,805,859 B2 | 10/2010 | Finkelstein |
| 7,886,461 B2 | 2/2011 | Sato |
| 8,056,263 B2 | 11/2011 | Schindler |
| 8,522,454 B2 | 9/2013 | Schindler |
| 9,320,316 B2 | 4/2016 | Guyan et al. |
| 9,572,402 B2 | 2/2017 | Jarvis |
| 9,788,600 B2 | 10/2017 | Wawrousek |
| 2001/0001904 A1 | 5/2001 | Hernadez |
| 2002/0023306 A1 | 2/2002 | Sajedi et al. |
| 2003/0051372 A1 | 3/2003 | Lyden |
| 2003/0069807 A1 | 4/2003 | Lyden |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0159014 A1 | 8/2004 | Sommer |
| 2004/0168329 A1 | 9/2004 | Ishimaru |
| 2004/0261295 A1 | 12/2004 | Meschter |
| 2005/0076536 A1 | 4/2005 | Hatfield et al. |
| 2005/0188564 A1 | 9/2005 | Delgorgue et al. |
| 2005/0282245 A1 | 12/2005 | Meschter et al. |
| 2005/0282454 A1 | 12/2005 | Meschter et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanaugh et al. |
| 2006/0143839 A1 | 7/2006 | Fromme |
| 2006/0201028 A1 | 9/2006 | Chan |
| 2006/0254087 A1 | 11/2006 | Fechter |
| 2007/0022631 A1 | 2/2007 | Ho |
| 2007/0163147 A1 | 7/2007 | Cavanagh et al. |
| 2007/0227041 A1 | 10/2007 | Menghini |
| 2007/0232753 A1 | 10/2007 | Monsheimer et al. |
| 2007/0240333 A1 | 10/2007 | Le et al. |
| 2008/0060221 A1 | 3/2008 | Hottinger |
| 2008/0115389 A1 | 5/2008 | Hsieh |
| 2008/0215176 A1 | 9/2008 | Borovinskih et al. |
| 2008/0289218 A1 | 11/2008 | Nakano |
| 2009/0012622 A1 | 1/2009 | James |
| 2009/0014424 A1 | 1/2009 | Meschter |
| 2009/0126225 A1 | 5/2009 | Jarvis |
| 2009/0145005 A1 | 6/2009 | Murphy et al. |
| 2009/0199437 A1 | 8/2009 | Pavkovic |
| 2009/0211119 A1 | 8/2009 | Moretti |
| 2009/0316965 A1 | 12/2009 | Milling et al. |
| 2010/0050480 A1 | 3/2010 | Moretti |
| 2010/0229430 A1 | 9/2010 | Berger et al. |
| 2011/0265352 A1 | 11/2011 | Lin |
| 2011/0277349 A1 | 11/2011 | Kim |
| 2012/0011782 A1 | 1/2012 | Kolas |
| 2012/0055043 A1 | 3/2012 | Schindler |
| 2012/0117825 A9 | 5/2012 | Jarvis |
| 2013/0074363 A1 | 3/2013 | Adams |
| 2014/0002019 A1 | 1/2014 | Park |
| 2014/0002677 A1 | 1/2014 | Schinker |
| 2014/0002903 A1 | 1/2014 | Shim |
| 2014/0020191 A1 | 1/2014 | Jones et al. |
| 2014/0025978 A1 | 1/2014 | Tokunaga |
| 2014/0026773 A1 | 1/2014 | Miller |
| 2014/0029030 A1 | 1/2014 | Miller |
| 2014/0029900 A1 | 1/2014 | Logan |
| 2014/0030067 A1 | 1/2014 | Kim |
| 2014/0109440 A1 | 4/2014 | McDowell |
| 2014/0109441 A1 | 4/2014 | McDowell |
| 2014/0115920 A1 | 5/2014 | McCue |

(56) References Cited

U.S. PATENT DOCUMENTS

| | | |
|---|---|---|
| 2014/0182170 A1 | 7/2014 | Wawrousek |
| 2014/0226773 A1 | 8/2014 | Toth et al. |
| 2014/0259787 A1 | 9/2014 | Guyan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2015/0033581 A1 | 2/2015 | Barnes |
| 2015/0128448 A1 | 5/2015 | Lockyer |
| 2015/0193559 A1 | 7/2015 | Musuvathy |
| 2016/0051009 A1 | 2/2016 | Kormann |
| 2016/0095385 A1 | 4/2016 | Nordstrom |
| 2016/0113352 A1* | 4/2016 | Guyan ............... A43B 13/127 12/146 B |
| 2016/0122493 A1* | 5/2016 | Farris ............... A43B 13/125 521/82 |
| 2016/0192740 A1* | 7/2016 | Guyan ............... A43B 13/127 36/25 R |
| 2016/0219976 A1* | 8/2016 | Guyan ............... A43B 13/127 |
| 2016/0242502 A1 | 8/2016 | Spanks |
| 2016/0324260 A1* | 11/2016 | Guyan ............... A43B 13/143 |
| 2016/0324261 A1* | 11/2016 | Guyan ............... A43B 13/181 |
| 2016/0325520 A1* | 11/2016 | Berger ............... B32B 3/12 |
| 2016/0374428 A1 | 12/2016 | Kormann |
| 2017/0136689 A1 | 5/2017 | Jarvis |
| 2017/0181496 A1* | 6/2017 | Guyan ............... A43B 13/181 |
| 2017/0224053 A1 | 8/2017 | Truelsen |
| 2017/0231322 A1 | 8/2017 | Gheorghian |
| 2017/0332733 A1 | 11/2017 | Cluckers |
| 2018/0008004 A1* | 1/2018 | Guyan ............... B29C 64/10 |
| 2018/0043805 A1* | 2/2018 | Baek ............... B29C 67/0051 |
| 2018/0049514 A1* | 2/2018 | Guyan ............... A43B 13/125 |
| 2018/0070736 A1* | 3/2018 | Achten ............... A47C 27/14 |
| 2018/0071979 A1* | 3/2018 | Achten ............... B29C 64/141 |

FOREIGN PATENT DOCUMENTS

| | | |
|---|---|---|
| CN | 2357543 | 1/2000 |
| CN | 1252344 | 5/2000 |
| CN | 2676682 | 2/2005 |
| DE | 202004018209 | 1/2005 |
| DE | 102005023473 | 11/2006 |
| EP | 0526892 A3 | 7/1993 |
| EP | 2564719 A1 | 6/2013 |
| EP | 2424398 B1 | 12/2015 |
| ES | 2442448 A1 | 2/2014 |
| JP | 08-197652 | 8/1996 |
| JP | 09-057874 | 3/1997 |
| JP | 09-277384 A | 10/1997 |
| JP | 10-240964 | 9/1998 |
| JP | 2002-001827 A | 1/2002 |
| JP | 2004-042545 A | 2/2004 |
| JP | 2009-045244 A | 3/2009 |
| WO | 0053398 | 9/2000 |
| WO | 2001024575 | 4/2001 |
| WO | 2004018966 | 3/2004 |
| WO | 2004073416 | 9/2004 |
| WO | 2004092346 | 10/2004 |
| WO | 29004092346 | 10/2004 |
| WO | 2006034261 | 3/2006 |
| WO | 2006047259 | 5/2006 |
| WO | 2006098715 A1 | 9/2006 |
| WO | 2008010855 | 1/2008 |
| WO | 2009035831 | 3/2009 |
| WO | 2009114715 | 3/2009 |
| WO | 2009055451 | 4/2009 |
| WO | 2009086520 | 7/2009 |
| WO | 2010126708 A2 | 11/2010 |
| WO | 2014008331 A2 | 1/2014 |
| WO | 2014009587 | 1/2014 |
| WO | 2014015037 A2 | 1/2014 |
| WO | 2014100462 A1 | 6/2014 |

* cited by examiner

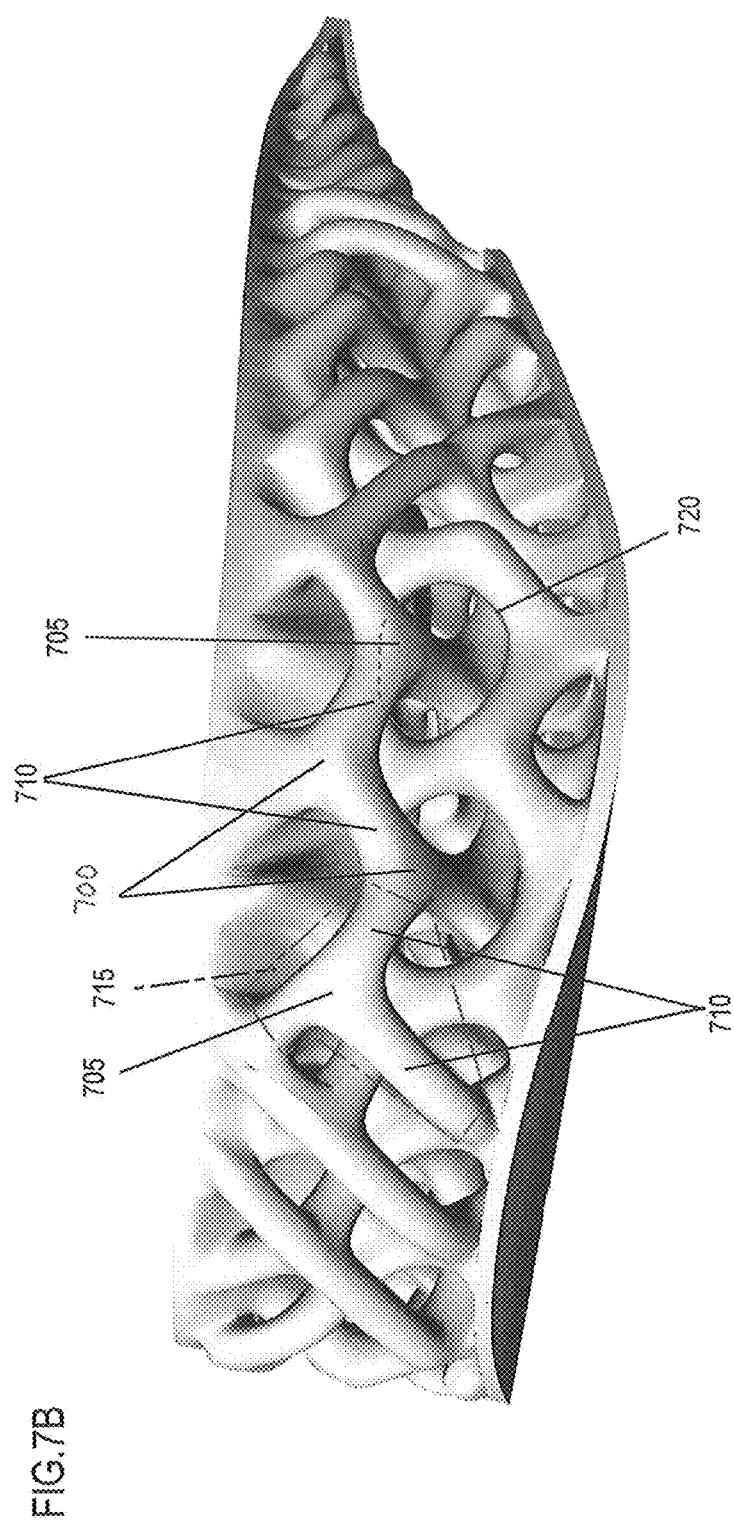

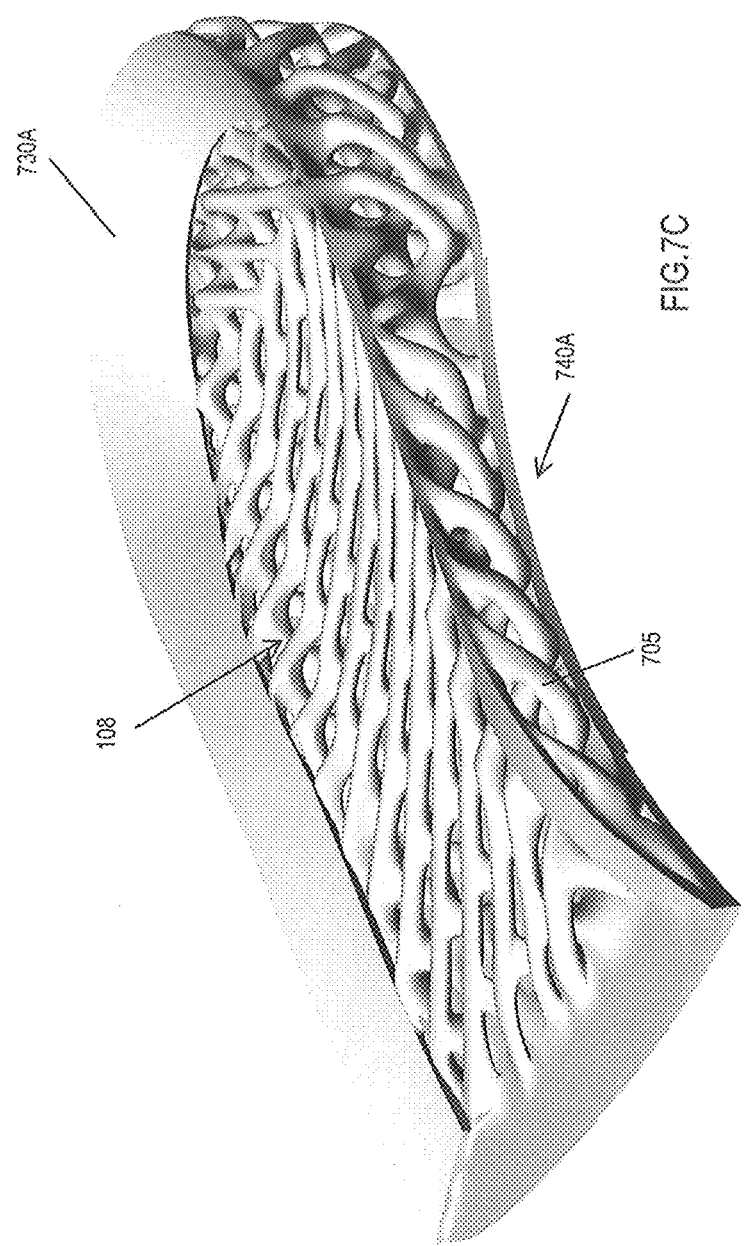

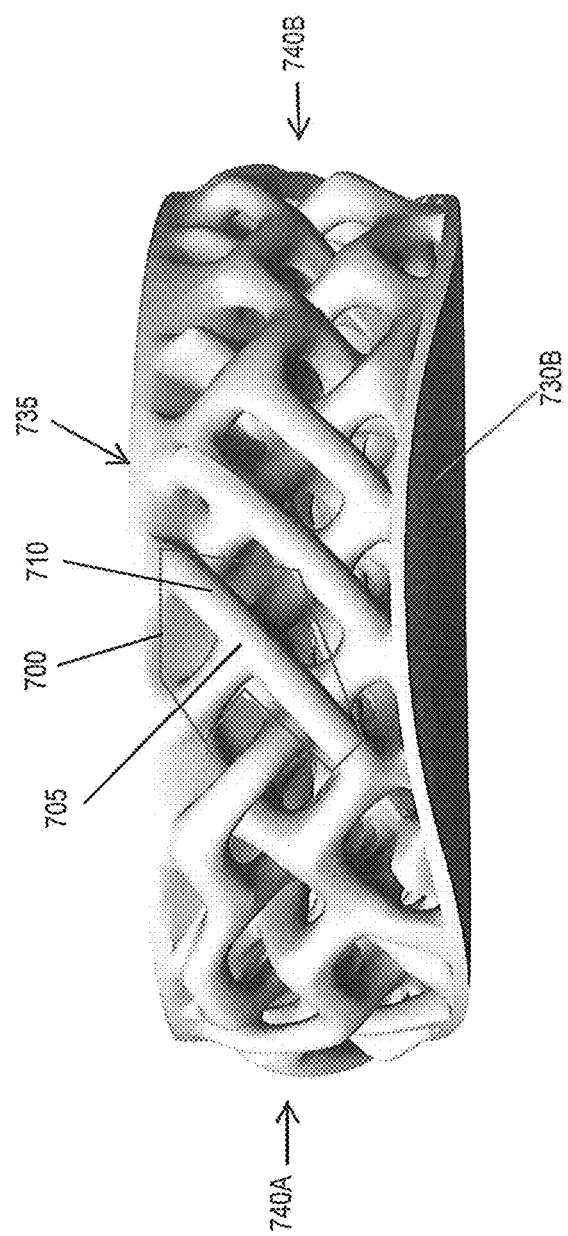

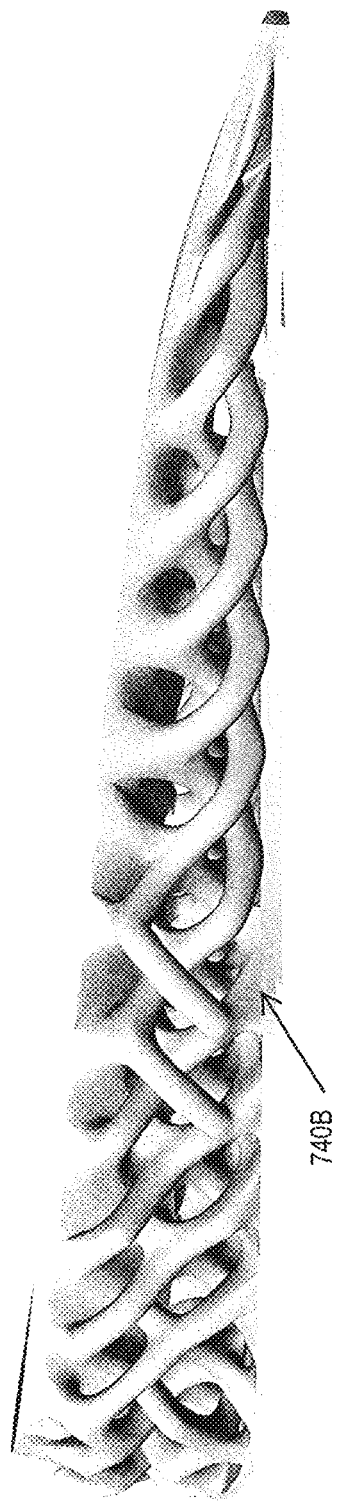

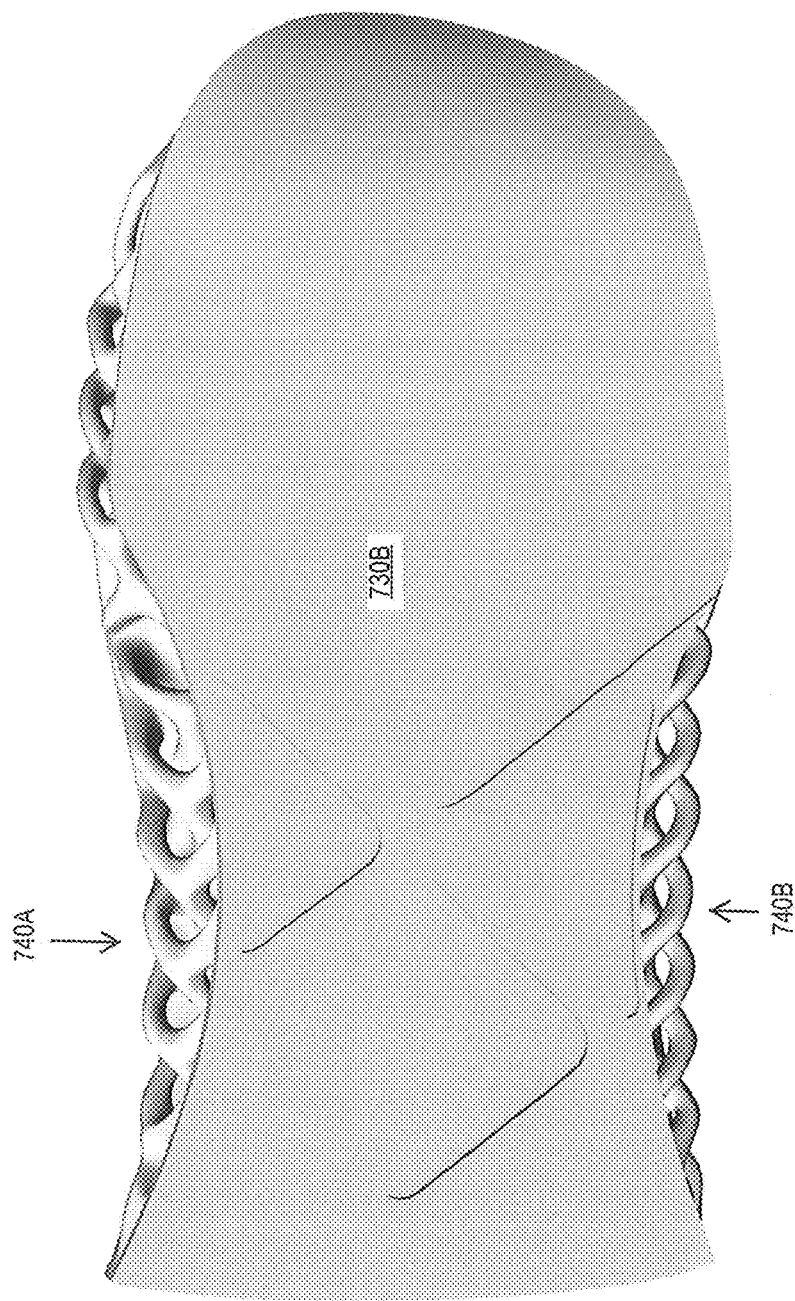

INTERWOVEN LATTICE STRUCTURE FOR CUSHIONING MEMBER

CROSS-REFERENCE TO RELATED APPLICATIONS

This application claims priority to United States provisional application Ser. No. 62/309,286, filed Mar. 16, 2016, the entire disclosure of which is hereby incorporated by reference in its entirety.

FIELD

This disclosure relates generally to footwear and specifically to support arrangements for articles of footwear.

BACKGROUND

Individuals use different types of shoes for different purposes. In recent years, athletic shoes have been designed to meet the needs of particular sports and athletic activities. Different types of athletic shoes include, for example, walking shoes, running shoes, basketball shoes, tennis shoes, volleyball shoes, and power-lifting shoes to name a few. Each of these different types of shoes targeted to specific athletic activities includes features that may or may not be present in the other types of shoes. For example, a runner may be primarily interested in energy return features that will make his or her stride as efficient as possible. On the other hand, a power lifter may more interested in the low-compression stability features that properly support the user during weight lifting activities. However, an athlete visiting a gym may split his or her time between power-lifting and running or other cardio activities. In these situations, the athlete typically changes shoes when transitioning between power-lifting and cardio or other gym activities.

While a change of shoes when switching from one type of athletic training to another is not uncommon, it is typically undesirable for most athletes. A change of shoes not only takes additional time during a work-out, but is also inconvenient. Moreover, the cost of owning two different pairs of shoes for athletic training activities is burdensome. Therefore, it would be advantageous to provide an athletic shoe that offered an athlete the advantages of a power-lifting shoe as well as a cardio-training shoe.

Cross-training shoes are a hybrid of several different types of athletic footwear and have been developed for use in different athletic areas in the past. For example, a cross-training shoe may be designed to include the heel cushioning of a running shoe, the lateral stability of a tennis or basketball shoe or basketball sneaker, and the forefoot cushioning of a volleyball shoe. However, designing a cross-training shoe that incorporates a number of distinct features that are typically unique to specific types of shoes is difficult. For example, it is difficult to provide a shoe incorporating all the energy return features desired by a runner along with all of the stability desired by a weight-lifter. It is also challenging to design such a shoe that is comfortable to the user, lightweight, and visually appealing.

In view of the foregoing, it would be advantageous to provide a shoe that incorporates features typical of different special purpose athletic shoes, such as incorporating the energy return qualities typical of a running shoe and the stability features of a power-lifting shoe. It would also be advantageous to provide a shoe that is comfortable for the user, lightweight and visually appealing.

SUMMARY

An article of footwear includes an upper and a sole assembly. The sole assembly includes a unitary, open-cell structure. Specifically, the sole assembly includes an interwoven lattice structure formed of a first network of struts and nodes that cooperate to define voids and an interlocking second network of struts and nodes that cooperate to define voids. The struts and nodes are configured to provide a cushioning member and generate predetermined support and flexure properties within the networks. The sole assembly may further include foamed material that cooperates with the microlattice structure to provide further cushioning.

In accordance with one exemplary embodiment of the disclosure, there is provided an article of footwear comprising an upper and a sole member connected to the upper. The sole member includes a first lattice structure including a first network of struts and nodes with voids defined between the struts and nodes. The sole member also includes a second lattice structure including a second network of struts and nodes with voids defined between the struts and nodes. The first network of struts and nodes is interwoven with the second network of struts and nodes such that the first network of struts and nodes extends through the voids in the second network of struts and nodes.

In accordance with another exemplary embodiment of the disclosure, there is provided a cushioning member including a first lattice structure and a second lattice structure. The first lattice structure includes a first network of struts and nodes with voids defined between the struts and nodes. The second lattice structure includes a second network of struts and nodes with voids defined between the struts and nodes. The first network of struts and nodes is interwoven with the second network of struts and nodes such that the first network of struts and nodes extends through the voids in the second network of struts and nodes.

In accordance with yet another exemplary embodiment of the disclosure, there is provided a method of manufacturing a cushioning member. The method comprises printing a first lattice structure including a first network of struts and nodes with voids formed between the struts and nodes. Simultaneous with printing the first lattice structure, the method comprises printing a second lattice structure including a second network of struts and nodes with voids formed between the struts and nodes. The first network of struts and nodes interwoven with the second network of struts and nodes such that the first network of struts and nodes extends through the voids in the second network of struts and nodes.

The above described features and advantages, as well as others, will become more readily apparent to those of ordinary skill in the art by reference to the following detailed description and accompanying drawings.

BRIEF DESCRIPTION OF THE DRAWINGS

FIG. 7B is an upper posterior perspective view of the lattice structure of FIG. 7A.

FIG. 7C is an upper anterior perspective view of a lattice structure of the article of footwear of FIG. 1, showing medial shoe side.

FIG. 7D is a rear view in elevation of the lattice structure of FIG. 7A.

FIG. 7F is a side view of the lattice structure of FIG. 7A, showing the lateral side.

FIG. 7G is a bottom view of a lattice structure of FIG. 7A.

DETAILED DESCRIPTION

Figure 1:
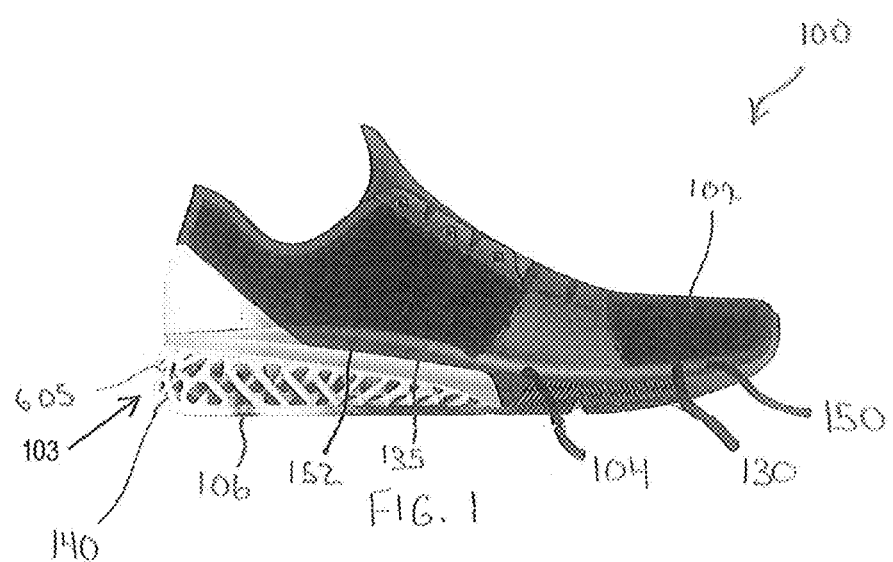
FIG. 1 is a lateral side view of an article of footwear including a midsole with lattice structure and resilient insert.
Figure 2:
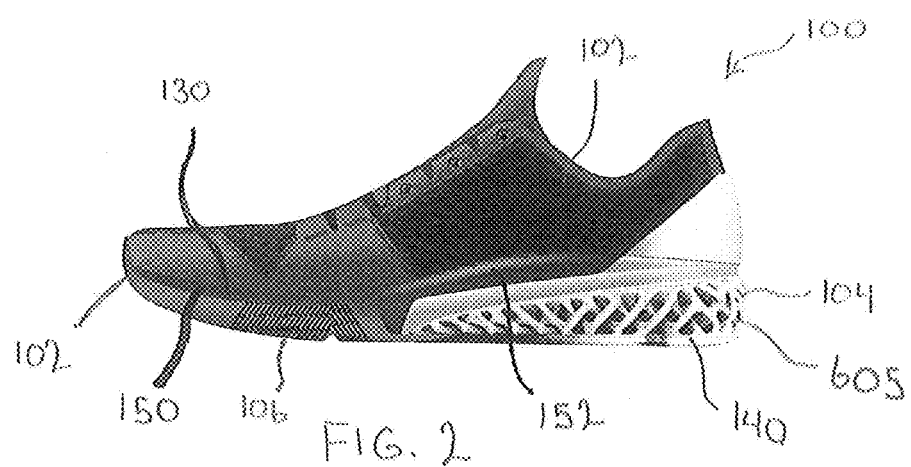
FIG. 2 is a medial side view of the article of footwear of FIG. 1.
Figure 3:
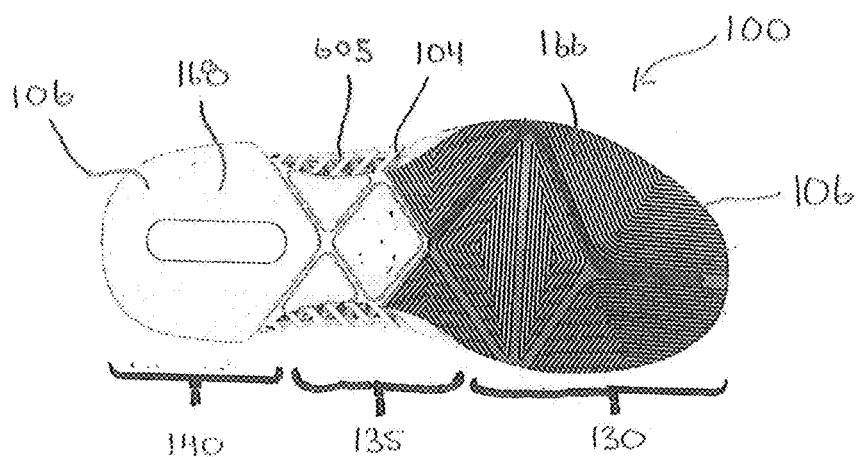
FIG. 3 is a bottom view of the article of footwear of FIG. 1.

With reference to FIGS. 1-5, an article of footwear 100 is shown in the form of a shoe including an upper 102 and a cushioning member provided by a sole assembly 103. The upper 102 includes a plurality of components configured to cover a human foot. The upper 102, in combination with an insole (not shown), forms a foot cavity operable to receive the foot. The insole is positioned under the foot of the wearer. The insole may include various components such as a strobel board and a sock liner. Various methods may be utilized to attach the upper 102 to the sole assembly 103, including stitching, adhesives, etc.

The components of the upper 102 may be presented in any of various configurations and thereby provide different forms of the footwear. For example, the upper 102 may be configured as a low-cut running shoe, a high-top basketball shoe, or any of various other forms of athletic shoes. The upper 102 may also be configured with various tightening mechanisms to secure the article of footwear 100 to the foot of the wearer. For example, the upper 102 may be configured such that the article of footwear 100 is a lace-up shoe, a slip-on shoe, or a strap-tightened boot.

In addition to being provided in any of various forms and configurations, the upper 102 may also be comprised of any of various materials. For example, the upper may include fabric, mesh, synthetic leather or natural leather, or any of various other materials or combinations thereof. The materials used on the upper 102 may depend, in part, on the particular type of footwear formed by the upper 102. For example, heavier and more rugged materials such as leather may be more prevalent on the upper 102 if the article of footwear is provided in the form of a boot or a cleat. Conversely, light-weight fabric may be more prevalent on the upper 102 if the article of footwear is provided in as a running shoe.

The sole assembly 103 provides a support and cushioning member for the article of footwear 100 and includes a midsole 104 disposed below the upper 102 and an outsole 106 disposed below the midsole. The midsole 104 is coupled to both the upper 102 and the outsole 106 utilizing any of various means, including adhesives, welding, stitching, etc.

The midsole 104 includes one or more structures operable to support the user and to adapt to load conditions during use. By way of example, the midsole 104 includes a stochastic and/or periodic cellular solid. In the embodiment illustrated in FIGS. 1-7H, the midsole 104 includes a microlattice structure 605 (which may also be referred to herein as a "lattice structure") and a foamed structure 610 (which may also be referred to herein as a "resilient insert").

Referring to FIGS. 7A, 7B, 7C, 7D, 7E, 7F, 7G, and 7H the microlattice 605 is an open cell structure possessing a lattice topology defined by a plurality of interconnected cells 700. Each cell 700 includes a node 705 from which a ligament or strut 710 extends. The nodes 705 are disposed at selected locations throughout the microlattice 605. By way of example, the nodes 705 form an array with nodes generally organized into columns and/or rows. The nodes 705 of adjacent rows/columns may be aligned or may be offset relative to each other. Because the struts are arranged in a manner to form the microlattice structure 605, the struts may also be referred to herein as "laths".

The struts 710 are structural members configured to flex in a predetermined direction under load or to resist flexure when a predetermined directional load is applied. The strut 710 may possess any profile suitable for its described purpose. Each strut 710 is generally non-linear. By way of example, a strut 710 may be generally arcuate, curving inboard, outboard, rearward, and/or forward as the strut travels distally from the node. By way of further example, a strut 710 may define a simple curve, a compound curve, and/or combinations thereof.

The cross section of the strut 710 may be any cross section suitable for its described purpose. In the illustrated embodiment, the struts 710 possess a generally circular cross section. The struts 710, moreover, may be solid or hollow structures.

As noted above, one or more struts 710 cooperate with a node 705 to define a cell 700. In an embodiment, a plurality of struts 710 are oriented in spaced relation about node. Accordingly, adjacent struts 710 on a node are angularly spaced from each other about node perimeter. A node 705 may include any number of struts suitable for its described purpose. By way of example, a cell 700 may include two, three, or four struts 710.

The interconnected cells 700 cooperate to define a plurality of pores or voids 720 within the microlattice 605. The voids 720 may be full voids (possessing a generally circular shape) or truncated voids (possessing a generally semicircular shape). The diameter of full voids 720 may be generally consistent throughout the microlattice 605. The microlattice 605 may be organized such that cells 700 selectively intersect the voids, with nodes 705 or struts 710 passing through a void.

Figure 7A:
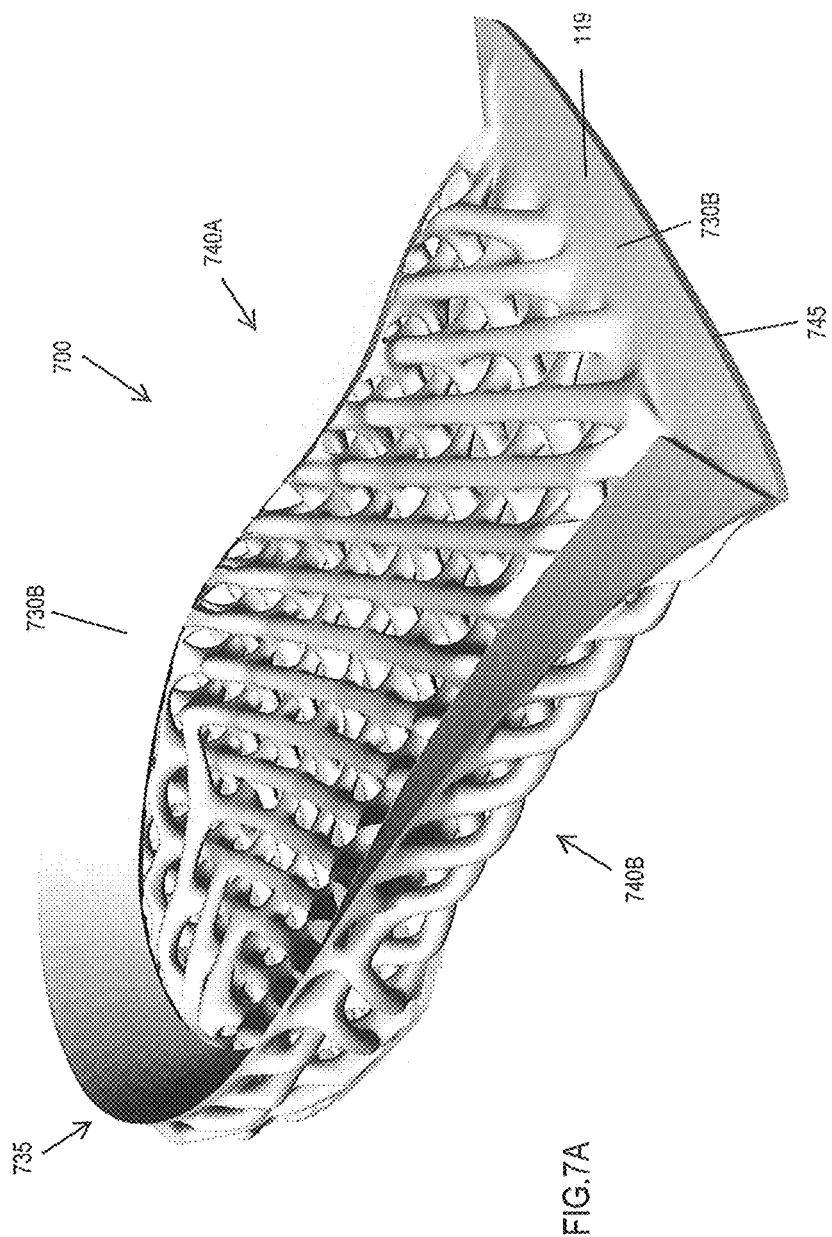
FIG. 7A is an upper anterior perspective view of a lattice structure of the article of footwear of FIG. 1, showing lateral shoe side.
Figure 7E:
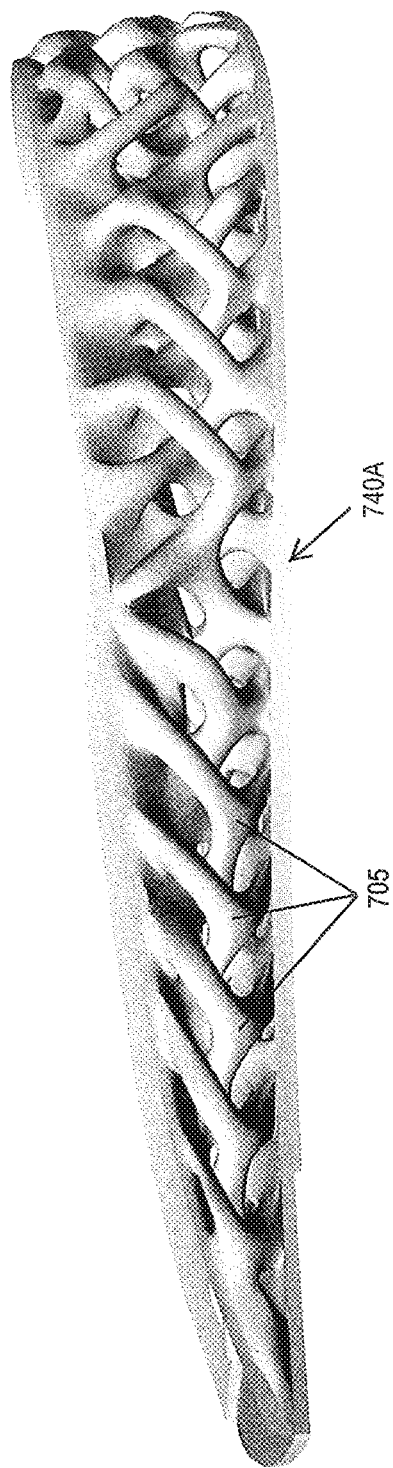
FIG. 7E is a side view of the lattice structure of FIG. 7A, showing the medial side.
Figure 7H:
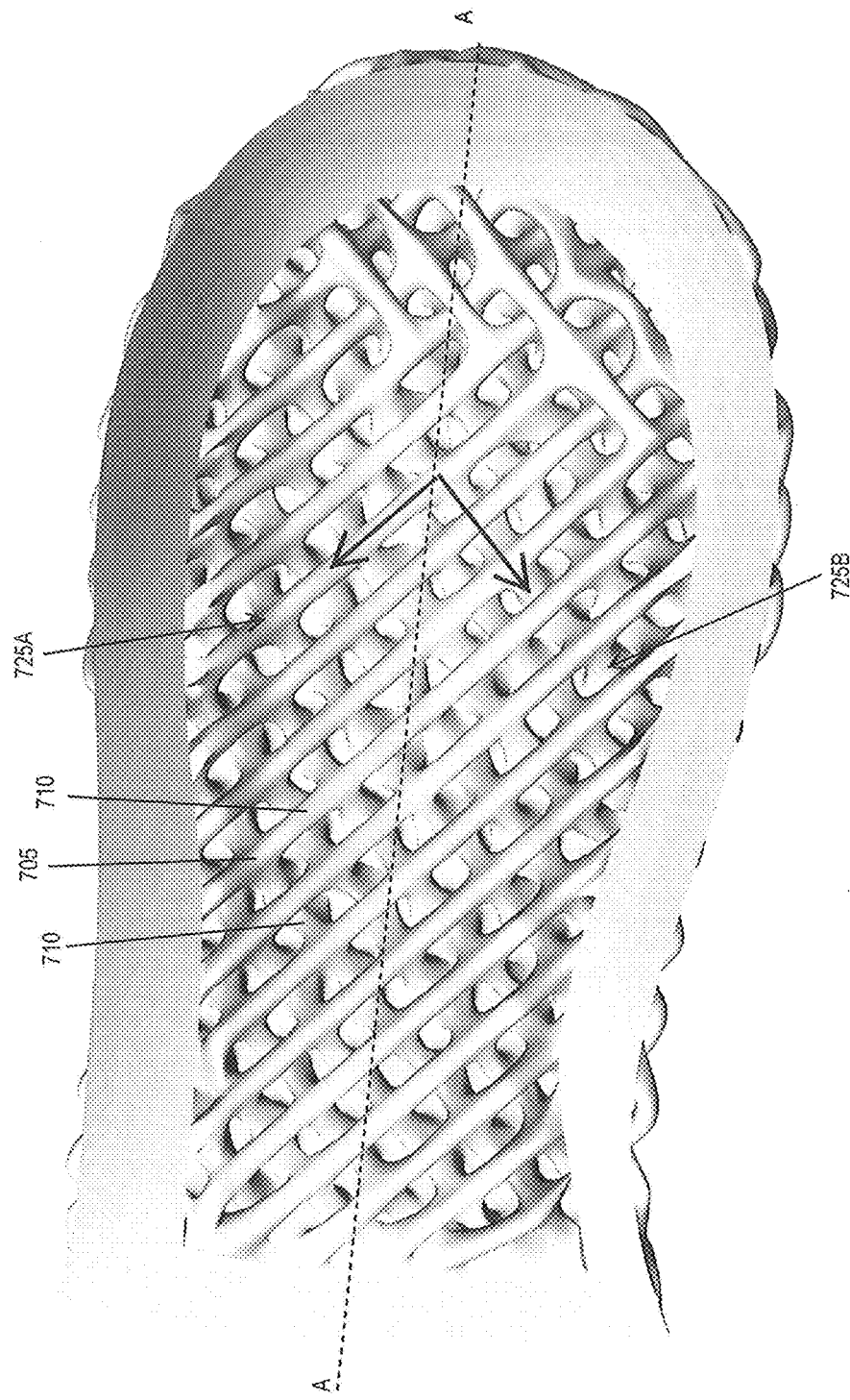
FIG. 7H is a top view of the lattice structure of FIG. 7A.

The microlattice 605, moreover, may possess a non-stochastic or periodic structure. Stochastic cellular structures have random variations in the shape and size of the cells. In contrast, periodic cellular structures have repeating cell structures. Referring to FIG. 7H, the microlattice 605 includes a first plurality of rows 725A and a second plurality of rows spanning the structure. The first plurality of rows 725A is oriented at an angle relative to the second plurality of rows 725B. Specifically, the first plurality of rows 725A is generally orthogonal to the second plurality of rows 725B. Each row 725A, 725B, moreover, is oriented at an angle relative to the longitudinal axis A of the microlattice 605. By way of example, the rows 725A, 725B are oriented 45° with respect to the microlattice axis A. This configuration positions the nodes 705, struts 710, and/or voids 720 at predetermined locations to define a regular repeating pattern of cells.

The dimensions of the nodes 705, struts 710, and/or voids 720 may be any suitable for the described purpose of the relevant component. By way of example, the nodes 705 may possess a diameter of approximately 5 mm to approximately 10 mm (e.g., 7 mm); the struts 710 possess a diameter of approximately 2 mm to approximately 5 mm (e.g., 3 mm); and the voids 720 possess a diameter of approximately 10 mm to approximately 15 mm (e.g., 12 mm).

The microlattice 605 may further include faceplates to form a truss or sandwich structure. Specifically, a first plate or panel 730A (which may also be referred to herein as an "upper shelf" or "upper platform") is disposed on the upper side of the microlattice 605 and a second plate or panel 730B (which may also be referred to herein as a "lower shelf" or "lower platform") is disposed along the lower side of the lattice. Each plate 730A, 730B, formed integrally with the lattice, is generally planar.

The microlattice 605 (including plates 730A, 730B) possesses a unitary (monolithic or unibody) construction. The material forming the microlattice 605 should be resilient to permit the absorption of forces and the production of return energy. In an embodiment, an elastomer such as thermoplastic polyurethane is utilized. Preferred materials are those suitable for additive manufacturing processes. Resilient material forms the microlattice 605. By way of example, an elastomer may be utilized. The microlattice 605 possesses a unitary (monolithic) construction; consequently, preferred materials are those suitable for additive manufacturing processes. Additive manufacturing fabricates objects directly from 3D model data by adding material layer upon layer. Examples include stereolithography, selective laser sintering, fused deposition modeling. By way of example, thermoplastic polyurethanes possessing hardness (ISO 868) of approximately 85-95 Shore A may be utilized (e.g., Desmosint®, Lehmann & Voss & Co., Germany). By way of specific example, thermoplastic polyurethanes possessing hardness (ISO 868) of approximately 85-95 Shore A may be utilized (e.g., Desmosint®, Lehmann & Voss & Co., Germany).

Because the lattice structure 605 is formed by 3D printing, the various components of the lattice structure, including the lower platform 730B, struts 710, and upper shelf 730A may be integrally formed without gate marks, sprue marks, parting line marks and ejector pin marks as are common with molded parts.

With the above configuration, the performance properties of the microlattice 605 may be customized by controlling the cell location, strut dimensions (strut length and diameter (thickness)), strut angle (from the node), as well as the position and nature of the voids within the structure. That is, strut placement may encourage or discourage flexure, controlling the movement properties of the microlattice 605 under load. Stated another way, by controlling the topology of the cellular solid, it is possible to control the micromechanical performance of the microlattice 605 under load. Accordingly, portions of the microlattice 605 may be configured to experience bending under load, while other portions may be configured to experience compression under load.

The microlattice 605 may be a conformal lattice structure, possessing a contoured topology operable to mate with another object. That is, the microlattice 605 is contoured to another surface and/or contoured to receive another structure. In the illustrated embodiment, the microlattice 605 may be formed with a receptacle operable to receive and support the foamed structure 610 (discussed in greater detail, below).

The microlattice 605 may traverse the full dimensions (length and width) of the article of footwear 100, or may be adapted to traverse only a portion of the article of footwear 100. In the embodiment illustrated in FIGS. 7A-7H, the microlattice 605 is a rearfoot support extending from the heel region 140 to the midfoot region 135 of the shoe. Accordingly, the rearfoot support begins proximate the heel, extending forward and terminating proximate the arch of the foot. As shown, the rearfoot support tapers downward as it travels forward from its rear edge 735 such that height of each of the medial side 740A and the lateral side 740B flattens, terminating at forward edge 745.

With continued reference to FIGS. 7A-7H, the upper shelf 730A of the lattice structure 605 provides a relatively smooth and continuous surface that extends around the upper perimeter of the lattice structure 605. In the embodiment of FIGS. 1-9, the upper shelf 730A extends only around the perimeter of the lattice structure 605 without extending into the center of the lattice structure. In this embodiment, the upper shelf 730A has a width between 5 mm and 20 mm, and this width may be different at various locations along the upper shelf 118. For example, the width of the upper shelf 730A near the heel region may be about 18 mm, while the width of the upper shelf 730A near the midfoot region is about 15 mm. The smooth and continuous surface of the upper shelf 730A is contoured to match that of the lower surface perimeter of the resilient insert 610. Accordingly, the resilient insert 610 is configured to receive and closely engage the upper shelf 730A, and the lattice structure 605, providing a convenient location for securing the resilient insert 610 and/or the upper 102 to the lattice structure 605. At the same time, the lattice structure 605, including the upper shelf 730A is configured to support the resilient insert 610 and/or the upper 102 within the article of footwear 100.

The upper shelf 730A generally provides the highest portion of the lattice structure 605, and more central portions of the lattice structure are situated at points below the upper shelf 730A. Accordingly, a recess 108 is formed in the lattice structure that is configured to receive the resilient insert. The upper shelf 730A and the lower shelf are separated by the laths in the heel region 140, but merge together in a front lip 119 in the midfoot region 135. Accordingly, in the embodiment shown in FIGS. 7A-7H, the height of the lattice structure 605 is tapered from the heel region 140 to the midfoot region 135, the height being significantly greater in the heel region 140 than the midfoot region 135. In the disclosed embodiment, the height of the lattice structure 605 in the heel region 140 may be between 5 mm and 30 mm, while the height of the lattice structure at the front lip 119 in the midfoot region is between 1 mm and 3 mm. The upper shelf 730A extends around the upper perimeter of the lattice structure 605 but does not completely cover the network of struts 710 and nodes 705. Therefore, when the resilient insert 610 is inserted into the recess 108, the perimeter of the lower side of the resilient insert 610 rests on upper shelf 730A, while more central portions of the lower side of the resilient insert rest directly on the lattice structure 605 (or on the front lip 119 in the midfoot region 135). However, in at least one alternative embodiment, the upper shelf 730A may be configured as a full platform that extends completely across the lattice structure 605 to completely cover the network of struts 710 and nodes 705, such that the resilient insert 610 rests completely on the upper shelf.

Figure 6A:
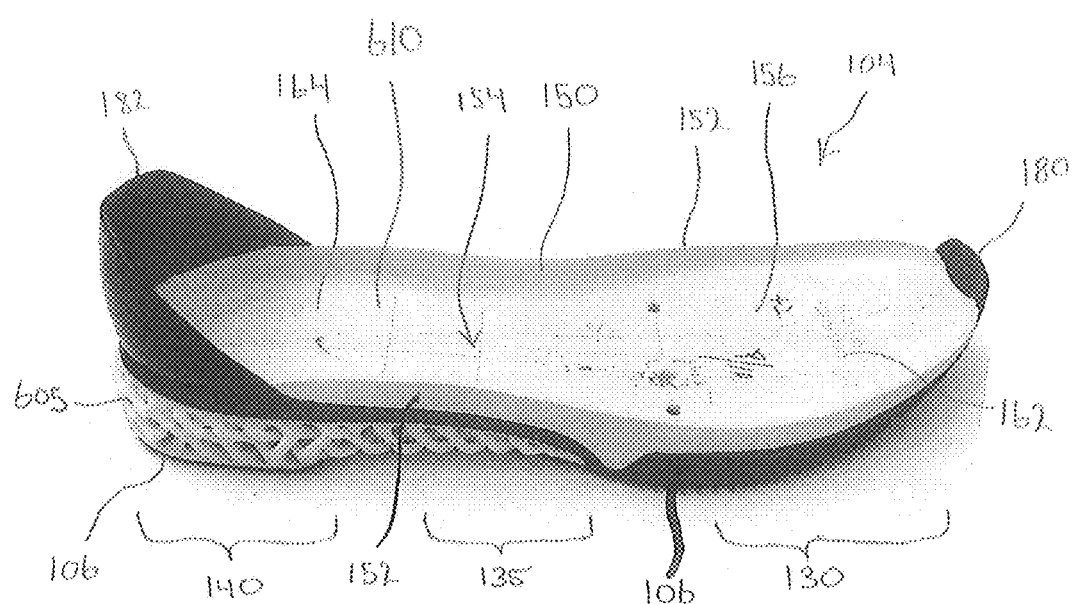
FIG. 6A is a top perspective view of a midsole and outsole of the article of footwear of FIG. 1, shown in isolation.
Figure 6B:
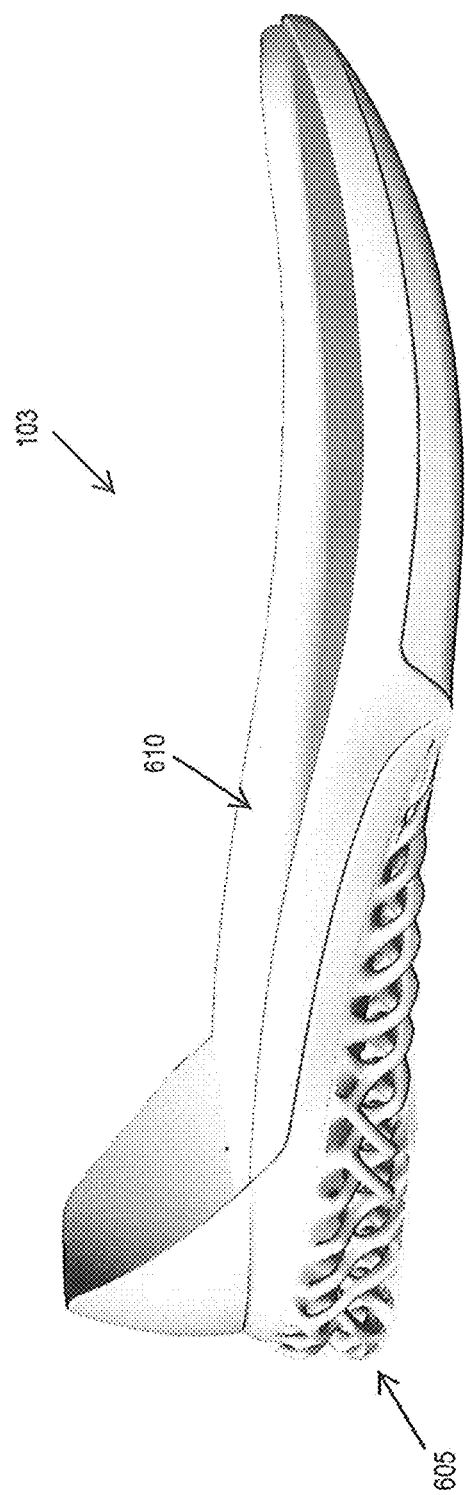
FIG. 6B is a perspective view of the midsole and outsole shown in FIG. 6A.

The foamed structure 610 may include a stochastic cellular solid such as open-celled foam or closed cell foam. With reference to FIGS. 6A and 6B, the resilient insert 610 is connected to the lattice structure 605 and is positioned within the recess 108 of the lattice structure 605. The resilient insert 610 extends above the lattice structure and is therefore superior to the lattice structure 605 in the heel region 140 and midfoot region 135 of the midsole. At least a second portion 164 of the resilient insert is positioned upon lattice structure 605 in the midfoot region and the heel region. A first portion 162 of resilient insert 610 is the only portion of the midsole that is provided in the forefoot region 130. Accordingly, the resilient insert 610 in the forefoot region 130 and midfoot region 135 may be considered to be adjacent to the lattice structure in the heel region 140 and midfoot region 135. The first portion 162 and second portion 164 provide an upper surface 156 of the resilient insert 610, which may serve as a footbed 154 for the shoe 100.

The resilient insert 610 is a unitary resilient member which may be formed of any of various materials adapted to provide the desired cushioning, energy return, or support needs in the area associated with the insert. In at least one embodiment, the resilient insert 610 may be formed of ethylene-vinyl acetate (EVA) or other elastomeric polymer material that is relatively soft and resilient. For example, the resilient insert 610 may be formed of EVA foam that is generally lightweight and provides a desired degree of cushioning and resiliency for the resilient insert 610.

The resilient insert 610 is generally configured to provide cushioning, energy return, and support qualities in the region of the midsole 104 associated with the resilient insert 610. When the resilient insert 610 is used in combination with the lattice structure 605 extending from the heel region 140 to the midfoot region 135, as shown in FIGS. 1-6, the midsole 104 provides a unique combination of dynamic stability and energy return such that the article of footwear may be advantageously used as both a power-lifting shoe and an aerobic training shoe or other athletic shoe.

Figure 4:
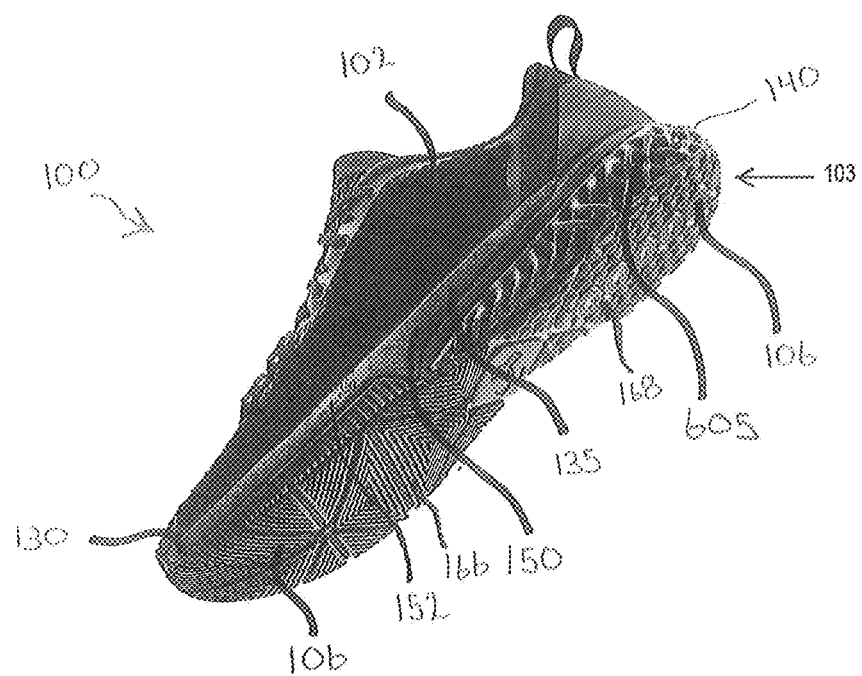
FIG. 4 is a lower perspective view of the article of footwear of FIG. 1.
Figure 5:
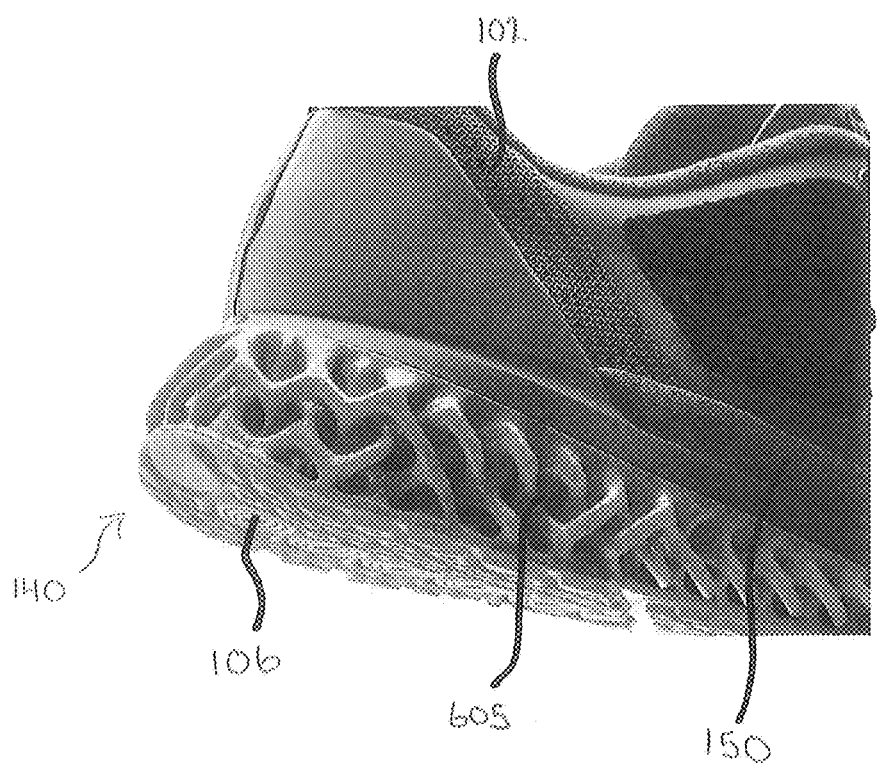
FIG. 5 is an enlarged lower perspective view of the heel region of the article of footwear of FIG. 1.

With reference again to FIGS. 3 and 4, the outsole 106 is provided by one or more durable pads 160 that are connected to the bottom of the midsole 104, including the downward-facing surface 122 of the lattice structure 605 (see FIG. 7E) and the lower surface of the resilient insert 610. The durable pads 160 may be provided by a continuous panel of material formed in a shape that covers the bottom of the midsole 104, or may be provided as different panels that cover different portions of the bottom of the midsole. In the embodiment shown in FIGS. 3 and 4, the outsole includes a first pad 166 covering most of the bottom of the forefoot region 130 of the midsole 104 and a second pad 168 covering most of the bottom of the heel region 140 of the midsole. The two different pads 166 and 168 may be provided with different grooves and ribs to provide different aesthetic or functional features on the bottom of the article of footwear. For example, in the embodiment of FIGS. 3 and 4, the first pad 166 includes a series of ribs and grooves that form triangular shapes. In contrast, as shown in FIG. 4, the second pad 168 may be provided as an array of circular shapes. An adhesive or other appropriate means may be used to connect the durable pads 160 to the downward facing surface 122 of the lattice structure 605 or the lower surface of the resilient insert 610.

The one or more durable pads 160 may be formed from any of various materials that provide the desired features and performance qualities of an outsole. In at least one embodiment, the durable pads are comprised of exterior grade EVA foam. The exterior grade EVA foam is a resilient material that provides an appropriate measure of traction and wear resistance for the outsole 106. In at least one alternative embodiment, the outsole may be comprised of different material such as a natural rubber, carbon rubber, blown rubber, styrene-butadiene co-polymer (SBR), polybutadiene, or some other rubber-like material.

As noted previously, the thickness of the outsole 106 may be consistent across the entire outsole, or may vary in different portions of the article of footwear 100. For example, in at least one embodiment the thickness of the outsole 106 is greater in the forefoot region 130 and thinner in the midfoot region 135. This embodiment may be particularly used when the thickness of the resilient insert 610 is consistent, and a thicker outsole 106 in the forefoot region is used to compensate for the thickness of the lattice structure 605 in the heel region. In other embodiments where the resilient insert 610 is thicker in the forefoot region 130 than the heel region 140, the outsole may include an outer perimeter wall that forms a central recess to receive the relatively thick resilient insert 610 in the forefoot region 130.

While the outsole 106 has been described herein as incorporating one or more pads 160 on the bottom of the article of footwear 100, it will be recognized that the pads 160 may include integrally formed portions that extend to locations other than the bottom of the article of footwear 100. For example, in the embodiment of FIGS. 1-5, the material that forms the outsole 106 may cover the groove 157 on the resilient insert 610 and extend to a toe flap 180 or a heel cup 182. Moreover, while a plurality of durable pads 160 form the outsole 106 in the embodiment of FIGS. 1-5, a single durable pad that substantially or completely covers the downward facing surface 122 of the midsole may alternatively be used to form the outsole 106.

Figure 8:
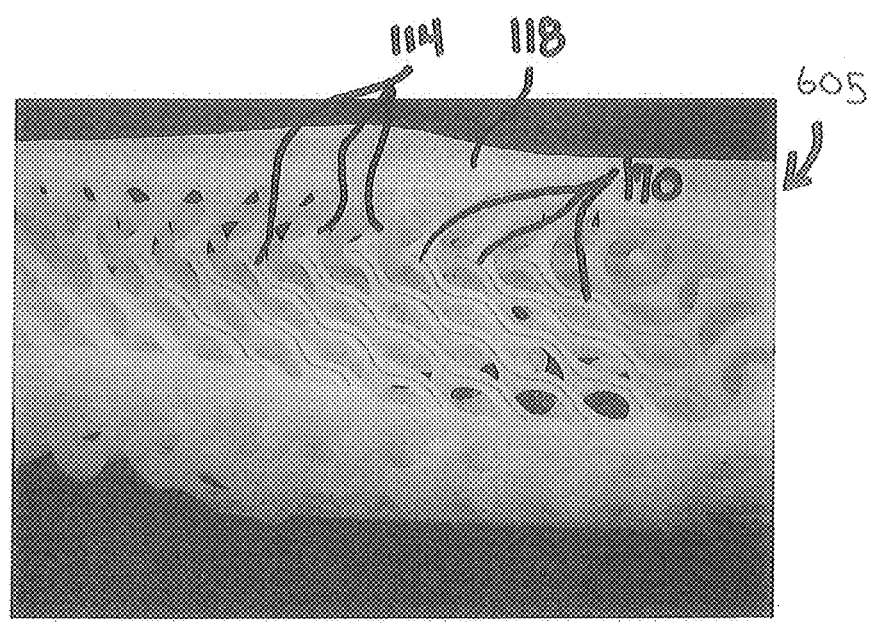
FIG. 8 is a perspective view of an embodiment of the midsole lattice structure of FIG. 1 showing parallel laths in a first layer of the lattice structure having a wave-like structure.

As discussed above, the lattice structure 605 and the resilient insert 610 may be provided in any of various configurations in order to provide the desired characteristics of the lattice structure 605 and the associated energy return features in targeted areas of the midsole. In the embodiments of FIGS. 1-11E, the laths 114 are provided as wave-like structures that are arranged in alternating layers. Each lath is generally cylindrical with a circular cross-section such that the girth of a lath may be calculated as being equal to $2 \times \pi \times r$, where r is the radius of the circular cross-section of the lath. FIG. 8 illustrates the wave-like structure of the laths 114 with lines 170. Each of the laths 114 is provided in a single layer of the lattice structure. The wave-like structure of the laths 114 is generally sinusoidal. Also, the laths 114 are all substantially parallel to one another in the illustrated layer.

Figure 9:
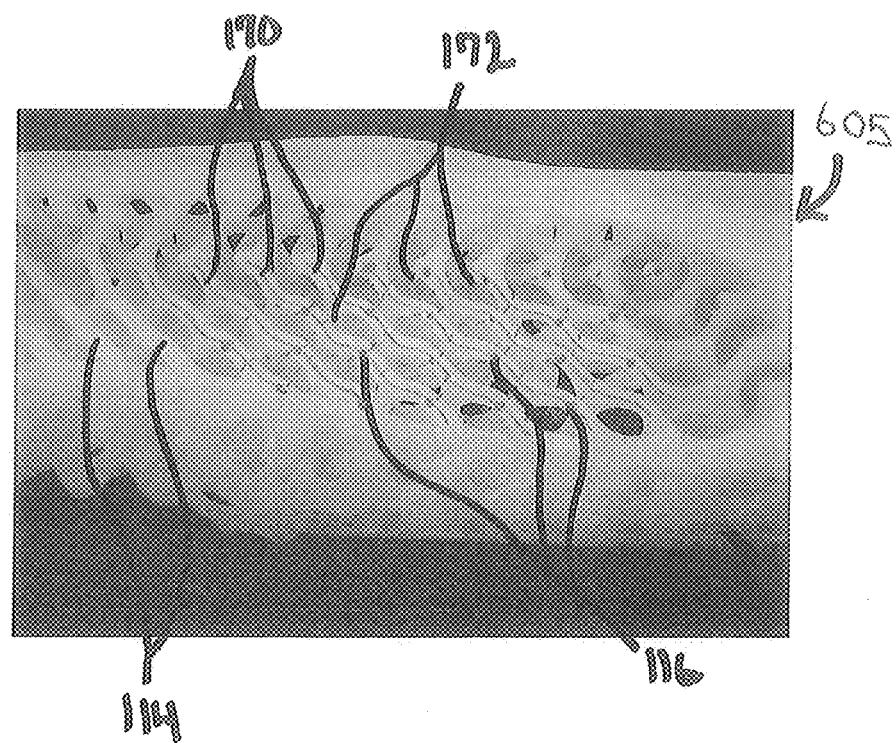
FIG. 9 is a perspective view of the midsole lattice structure of FIG. 8 with dotted lines illustrating the wave-like structure of the parallel laths in a second layer of the lattice structure that is above the first layer.

FIG. 9 illustrates the arrangement of a second layer of laths 114 with dotted lines 172 extending over the lines 170 (which represent the laths of the first layer). It will be recognized the laths of the second layer of the lattice structure 605 are not shown in FIG. 9 for clarity, but the laths of the second layer follow the pattern of the dotted lines 172. The laths of the second layer are provided on top of the laths of the first layer. Similar to the laths of the first layer, the laths of the second layer are also parallel to each other. However, as can be seen by comparing lines 170 and dotted lines 172, the laths of the second layer are oriented in a transverse direction to the laths 114 of the first layer. In at least one embodiment, the laths of the first layer are oriented about ninety degrees (90°) relative to the laths of the second layer. As shown in FIG. 9, nodes 116 are formed where the laths 114 of the first layer contact the laths of the second layer. The nodes 116 may therefore be considered to be locations wherein the laths of one layer intersect and conjoin with the laths of another layer. In the embodiment of FIG. 9, the nodes are provided at locations where the peaks of the wave-like laths from a lower layer engage the valleys of the wave-like laths from an upper layer. Advantageously, the nodes 116 in the disclosed lattice structure 605 act as cam-like structures, wherein the laths 114 rotate about the nodes when the lattice structure 605 is compressed. As will be recognized, the lattice structure 605 may include any number of vertically stacked layers and the laths 114 in each alternating layer are transverse to each other.

In addition to various lattice configurations, the performance characteristics provided by the lattice structure 605 may also be adjusted by adjusting the dimensions of the elements of the lattice structure. In particular, as described in U.S. patent application Ser. No. 13/829,624, filed Mar. 14, 2013, the contents of which are incorporated herein by reference in their entirety, the dimensions of the laths 114 may be adjusted to provide increased stability or increased cushioning depending on the desired performance characteristics of the lattice structure in various regions of the midsole. Because the foot varies in shape and structure between different users, and bears different amounts of pressure in different regions during different stages of a gait cycle, different zones of the lattice structure 605 may differ in shape and structure to provide a desired support for a particular type of foot or gait cycle. For example, the laths 114 located within an arch zone of the lattice structure 605 may have girths that differ from the girths of laths located within a ball of the foot zone. Additionally, within the transition areas between two zones, gradations in lath girth may occur. As a result, relatively smooth transitions of girth may occur when moving from one end of the lattice structure 605 to another, or from one side of the lattice structure to another. In general, thicker girths provide a lattice structure 605 in the associated zone that is more stable and less compressible. On the other hand thinner girths provide a lattice structure 605 in the associated zone that provides more cushion and energy return qualities.

While the lattice structure 605 has been described herein as comprising wave-like structures that are arranged in alternating layers, it will be recognized that the lattice structure 605 may be provided by any number of different lattice structures and arrangements. For example, the network of laths 114 and nodes 116 may be configured as a repeating series of octahedron structures, similar to the arrangement of the laths and related cell units described in U.S. patent application Ser. No. 13/829,624.

Figure 10:
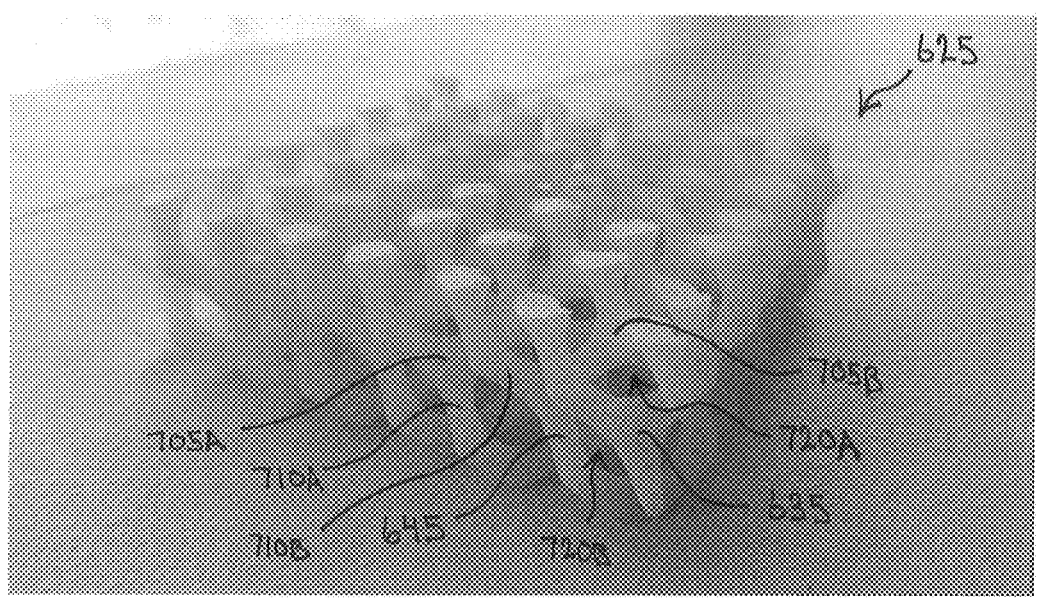
FIG. 10 is a perspective view of one embodiment of the lattice structure of FIG. 1, the lattice structure including a first lattice structure interwoven with a second lattice structure.
Figure 11A:
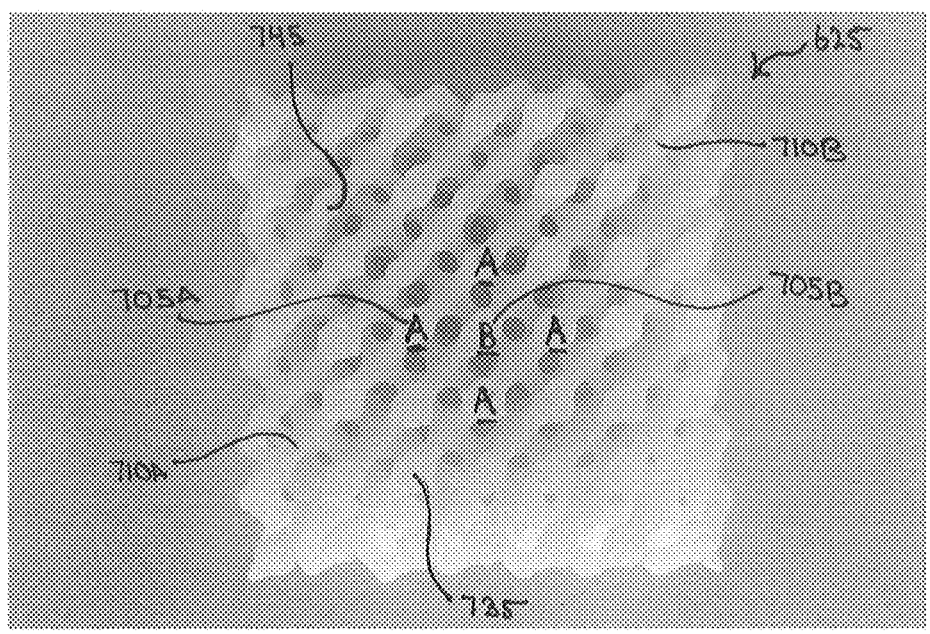
FIG. 11A is a plan view of the lattice structure of FIG. 10 with the first lattice structure in a neutral position relative to the second lattice structure.
Figure 11B:
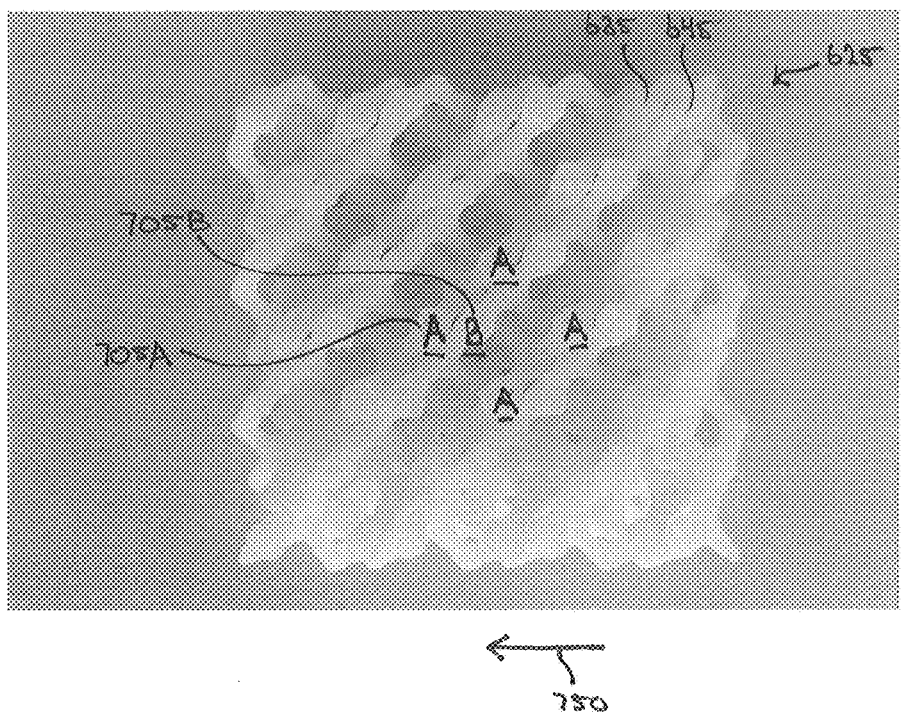
FIG. 11B shows the second lattice structure of FIG. 11A shifted to the left relative to the first lattice structure.
Figure 11C:
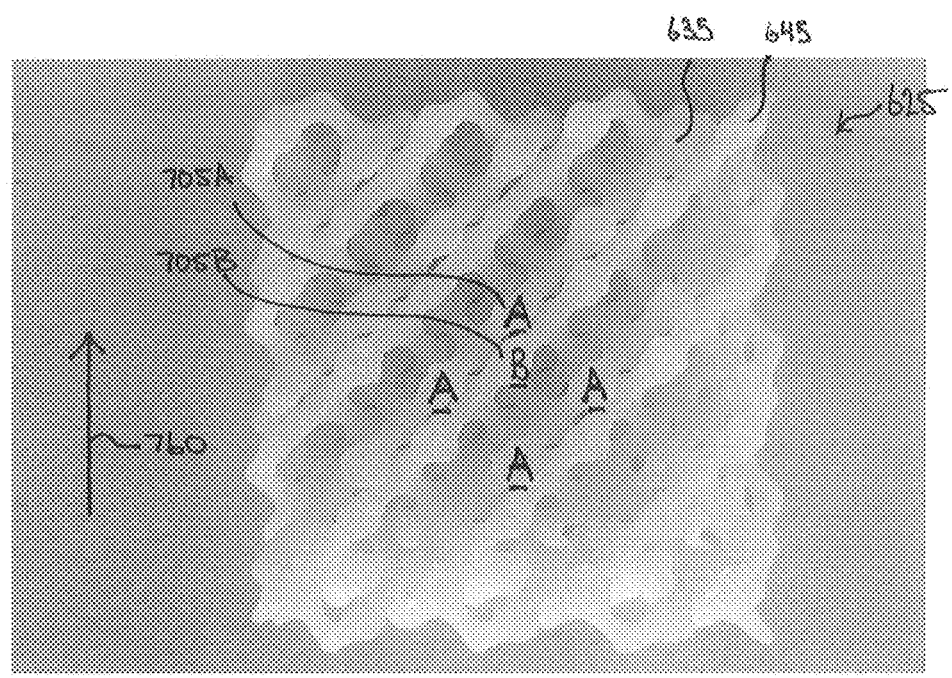
FIG. 11C shows the second lattice structure of FIG. 11A shifted forward relative to the first lattice structure.
Figure 11D:
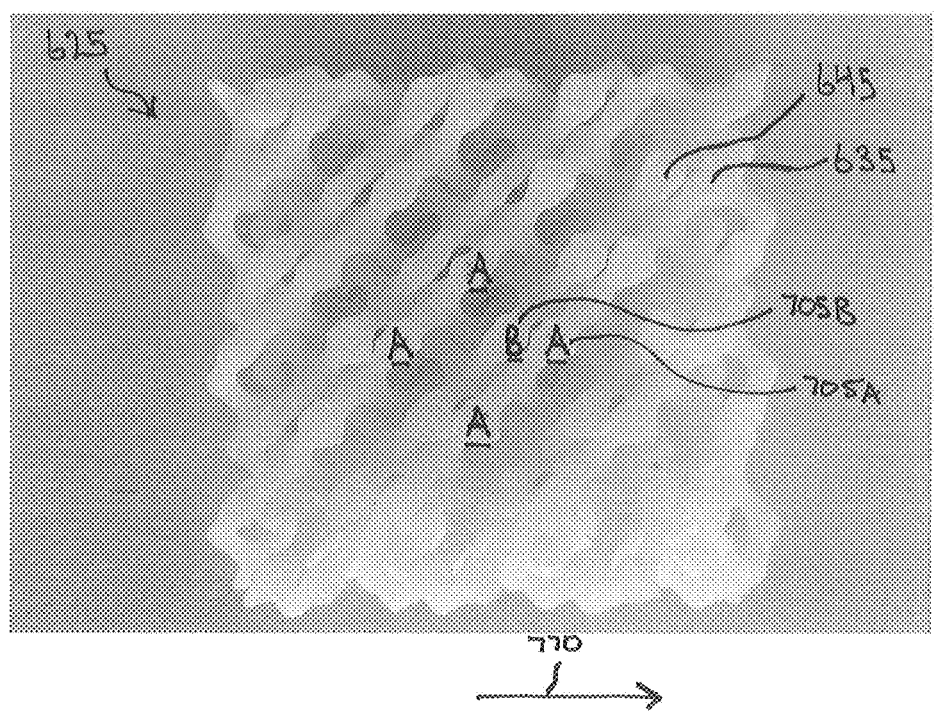
FIG. 11D shows the second lattice structure of FIG. 11A shifted to the right relative to the first lattice structure.
Figure 11E:
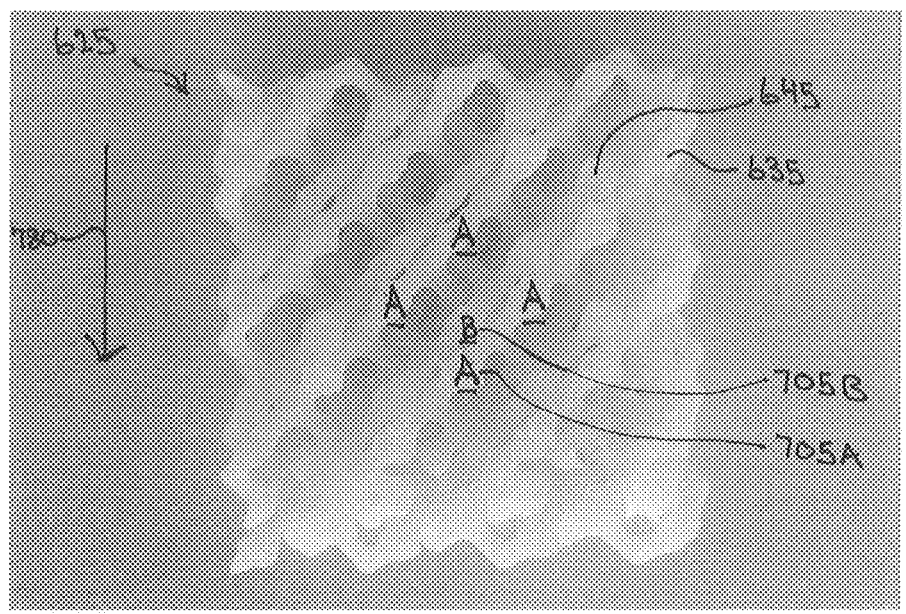
FIG. 11E shows the second lattice structure of FIG. 11A shifted backward relative to the first lattice structure.

With reference now to FIGS. 10-11E, in at least one embodiment, the lattice structure 605 is provided as an interwoven lattice structure 625. The interwoven lattice structure 625 includes a first lattice structure 635 interwoven with a second lattice structure 645 in an interlocking arrangement. The first lattice structure 635 includes a first network of struts 710A and nodes 705A, with voids 720A defined between the struts 710A and nodes 705A. Similarly, the second lattice structure 645 includes a second network of struts 710B and nodes 705B, with voids 720B defined between the struts 710B and nodes 705B. The first network 635 of struts 710A and nodes 705A is interwoven with the second network 645 of struts 710B and nodes 705B such that the first network of struts 710A and nodes 705A extends through the voids 720B in the second network of struts 710B and nodes 705B. Similarly, the second network of struts 710B and nodes 705B extends through the voids 720B in the first network. As used herein, an "interwoven" structure is not limited to a structure created by physically weaving components together, but also includes a structure having components with interlacing, crossing, overlapping, or blended parts. As a result, at least portions of two interwoven components will occupy a common space. As used herein, "interlocking" components are positioned or arranged in such a manner that motion of one component is at least partially constrained by the other.

Although the first lattice structure 635 and second lattice structure 645 are interwoven and interlocking, the first lattice structure 635 is independent of and disengaged from the second lattice structure 645. In other words, although the first lattice structure 635 cannot be completely released from the second lattice structure 645, the first lattice structure 635 does not contact the second lattice structure 645 and is freely moveable with respect to the second lattice structure 645 until the first lattice structure 635 comes into contact with the second lattice structure 645. FIGS. 11A-11E illustrate this disengaged but interlocking arrangement between the first lattice structure 635 and the second lattice structure 645.

FIG. 11A shows the first lattice structure 635 in a neutral position with respect to the second lattice structure 645, the first lattice structure disengaged from the second lattice structure. In this neutral arrangement, the first network of struts 710A and nodes 705A of the first lattice structure 635 does not contact the second network of struts 710B and nodes 705B of the second lattice structure. To illustrate this neutral position, four nodes 705A (each identified by an "A" in FIG. 11A) of the first lattice structure 635 are shown surrounding one node 705B (identified by a "B" in FIG. 11A) of the second lattice structure 645. The nodes 705A of the first lattice structure 635 are disengaged from the nodes 705B of the second lattice structure 645. Also, the struts 710B of the second lattice structure 645 extend under but do not touch the node 705A of the first lattice structure 635. Similarly, the struts 710A of the first lattice structure 635 extend under but do not touch the node 705B of the second lattice structure. With the first lattice structure 635 in this disengaged and neutral position relative to the second lattice structure 645, the second lattice structure 645 is freely moveable in any direction relative to the first lattice structure 635 until the second lattice structure 645 comes into engagement with the first lattice structure 635.

FIG. 11B shows the second lattice structure 645 moved to the left (in the direction of arrow 750) from the neutral position (of FIG. 11A) while the first lattice structure 635 remained stationary. In FIG. 11B, the second lattice structure 645 engages the first lattice structure 635, as illustrated by the node 705B of the second lattice structure 645 engaging the adjacent left node 705A of the first lattice structure 635. Other struts 710B and nodes 705B of the second lattice structure 645 are also shifted leftward relative to the struts 710A and nodes 705A of the first lattice structure 635. Because the second lattice structure 645 is now in engagement with the first lattice structure 635, the second lattice structure 645 is blocked from moving any further to the left relative to the first lattice structure 635.

FIG. 11C shows the second lattice structure 645 moved to forward (in the direction of arrow 760) from the neutral position (of FIG. 11A) while the first lattice structure 635 remained stationary. In FIG. 11C, the second lattice structure 645 engages the first lattice structure 635, as illustrated by the node 705B of the second lattice structure 645 engaging the adjacent forward node 705A of the first lattice structure 635. Other struts 710B and nodes 705B of the second lattice structure 645 are also shifted forward relative to the struts 710A and nodes 705A of the first lattice structure 635. Because the second lattice structure 645 is now in engagement with the first lattice structure 635, the second lattice structure 645 is blocked from moving any further forward relative to the first lattice structure 635.

FIG. 11D shows the second lattice structure 645 moved to the right (in the direction of arrow 770) from the neutral position (of FIG. 11A) while the first lattice structure 635 remained stationary. In FIG. 11D, the second lattice structure 645 engages the first lattice structure 635, as illustrated by the node 705B of the second lattice structure 645 engaging the adjacent right node 705A of the first lattice structure 635. Other struts 710B and nodes 705B of the second lattice structure 645 are also shifted rightward relative to the struts 710A and nodes 705A of the first lattice structure 635. Because the second lattice structure 645 is now in engagement with the first lattice structure 635, the second lattice structure 645 is blocked from moving any further to the right relative to the first lattice structure 635.

FIG. 11E shows the second lattice structure 645 moved rearward (in the direction of arrow 780) from the neutral position (of FIG. 11A) while the first lattice structure 635 remained stationary. In FIG. 11E, the second lattice structure 645 engages the first lattice structure 635, as illustrated by the node 705B of the second lattice structure 645 engaging the adjacent rear node 705A of the first lattice structure 635. Other struts 710B and nodes 705B of the second lattice structure 645 are also shifted rearward relative to the struts 710A and nodes 705A of the first lattice structure 635. Because the second lattice structure 645 is now in engagement with the first lattice structure 635, the second lattice structure 645 is blocked from moving any further to the rear relative to the first lattice structure 635.

While FIGS. 11A-11E illustrate various positions to which the second lattice structure 645 may be moved relative to the first lattice structure 635, it will be appreciated that numerous other positions are possible. For example, the second lattice structure 645 may be moved upward (e.g., in a direction out of the page of FIG. 11A) or downward (e.g., in a direction into the page of FIG. 11A) relative to the first lattice structure. Accordingly, it will be recognized that the second lattice structure 645 is freely moveable relative to the first lattice structure 635, and vice-versa. However, because the first lattice structure 635 and the second lattice structure 645 are interlocking, the extent of movement of one lattice structure relative to the other is limited to the point at which the lattice structures engage one another.

It will be recognized that the first lattice structure 635 and the second lattice structure may be provided in any number of different configurations with any number of different network arrangements for the struts 710 and the nodes 705. In the disclosed embodiment, the first lattice structure 635 and the second lattice structure 645 are constructed similar to that shown in FIGS. 7A-7C and related FIGS. 8 and 9. In this embodiment, the first lattice structure 635 includes a first network of struts 710A and nodes 705A. The struts 710A are configured as parallel wave structures in multiple layers, wherein the parallel wave structures in a first layer are transverse to the parallel wave structures in a second layer, and wherein nodes 705A are defined at locations where the wave structures in the first layer intersect the wave structures in the transverse second layer. Similarly, the second lattice structure 645 includes a second network of struts 710B and nodes 705B. The struts 710B are configured as parallel wave structures in multiple layers, wherein the parallel wave structures in a first layer are transverse to the parallel wave structures in a second layer, and wherein nodes 705B are defined at locations where the wave structures in the first layer intersect the wave structures in the transverse second layer.

It will be recognized that in the embodiment of FIGS. 10-11E, the first lattice structure 635 and the second lattice structure 645 are identical in configuration. Even though the first lattice structure 635 and the second lattice structure 645 consume the same space, the position of the network of struts 710A and nodes 705B of the first lattice structure 635 is shifted relative to the position of the network of struts 710B and nodes 705B of the second lattice structure 645. Because of this shifted position, the network of struts 710A and nodes 705B of the first lattice structure 635 is interwoven with but does not engage the network of struts 710B and nodes 705B of the second lattice structure 645.

In at least one embodiment, the interwoven lattice structure 625 of FIGS. 10-11E is provided as a support and cushioning member, such as the lattice structure 605 for the midsole 104 of the shoe 100 of FIGS. 1-9. In this embodiment, the first lattice structure 635 and the second lattice structure may each be connected to a plate-like surface such as the upper shelf 730A or the lower platform 730B. In this embodiment, the interwoven lattice structure 625 may be provided as a unitary (monolithic) construction. However, even when the interwoven lattice structure 625 possesses a unitary construction with the first lattice structure 635 and the second lattice structure 645 connected to a common surface (e.g., the lower platform 730B), each lattice structure remains independent and disengaged from the other lattice structure. In particular, even though the first lattice structure 635 and the second lattice structure 645 may both be connected to the lower platform 730B, the struts 710A and nodes 705A of the first lattice structure remain disengaged from the struts 710B and nodes 705A of the second lattice structure, and flexation or movement of the first lattice structure does not necessarily result in flexation or movement of the second lattice structure.

While the interwoven lattice structure 625 has been disclosed as providing a midsole in at least one embodiment, it will be recognized that the interwoven lattice structure may also be used for other cushioning arrangements. For example, in at least one embodiment, the interwoven lattice structure is provided as a pad member for an article of apparel other than an article of footwear. The article of apparel may be any article of apparel for which a pad arrangement is desired, such as an athletic garment, protective headgear, a bag, or any other article of apparel. Alternatively, the interwoven lattice structure 625 may provide a pad member for a purpose other than an article of apparel. For example, the interwoven lattice structure 625 may be used for a floor pad, a wall pad, vehicle pad, or for any of various other cushioning purposes.

Figure 12:
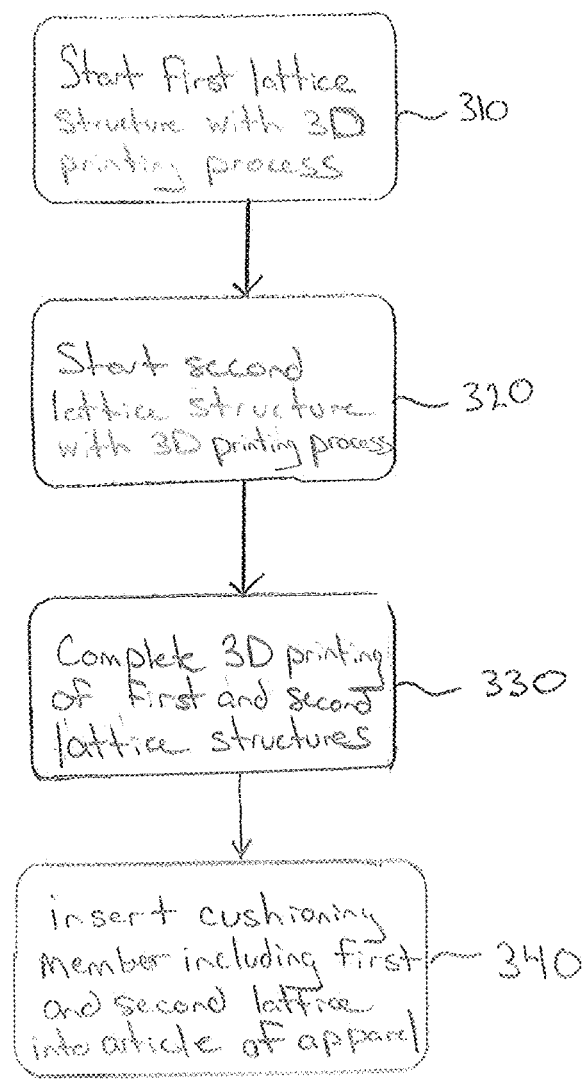
FIG. 12 is a block diagram of a method for making a midsole including a lattice structure and a resilient insert.

With reference now to FIG. 12, a method of making a cushioning member as described above is shown. The method includes printing a first lattice structure using a 3D printing process, as noted in step 310. The first lattice structure includes a network of struts and nodes with voids formed between the struts and nodes. After starting the printing the first lattice structure, the method moves to step 320 and starts printing a second lattice structure. The second lattice structure includes a second network of struts and nodes with voids formed between the struts and nodes. As the first lattice structure is printed along with the second lattice structure, the first network of struts and nodes are formed such that they are interwoven with the second network of struts and nodes, with the first network of struts and nodes extending through the voids in the second network of struts and nodes, and vice-versa. While step 320 is shown after step 310 in FIG. 12 since the printing of the first lattice structure will generally begin at least slightly before the start of the second lattice structure, it will be recognized that the printing of the first and second lattice structures generally occurs simultaneously over a period of time. In this manner the first lattice structure may be formed such that it is interwoven with the second lattice structure. Printing of the first lattice structure and second lattice structure continues until the interwoven first lattice structure and second lattice structure are completed in step 330.

As noted in step 340 of FIG. 12, after the first lattice structure and the second lattice structure are completed in step 330, the method further includes inserting the cushioning member into an article of apparel. The article of apparel may be, a garment (e.g., a padded garment), and article of footwear (e.g., a shoe), headgear, bag, or any of various other articles of apparel that include a cushioning member. In alternative embodiments, the cushioning member is incorporated into a pad member for a purpose other than an article of apparel. For example, the cushioning member may be used for a floor pad, a wall pad, vehicle pad, or for any of various other cushioning purposes.

As described herein, a two part midsole including a lattice structure and resilient insert may configured in various ways to allow for targeted features in different zones of a midsole. It will be appreciated that the performance characteristics of the midsole may be adjusted as desired based on the arrangement and configuration of the lattice structure and the associated placement of the resilient insert. Additionally, performance characteristics of the midsole may also be adjusted by different configurations in the lattice structure itself or different configurations in the resilient insert.

The foregoing detailed description of exemplary embodiments of the interwoven lattice for cushioning member has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

For example, while the figures disclosed herein reference to various regions of the midsole 104 or article of footwear 100, including the forefoot region 130, midfoot region 135, it will be recognized that each of these regions generally corresponds to the area of a human foot associated with such region in the article of footwear 100. Furthermore, it will be recognized that overlap may occur between regions or that a transition region may be defined between each of these regions. Accordingly, when various portions of the midsole 104 are described herein as extending to different "regions", it will be recognized that these regions may be generally defined with reference to a human foot positioned within the associated article of footwear.

It will further be recognized that the lattice structure may be arranged in any of a number of different configurations different from those shown in FIGS. 1-11E, including differently shaped struts, nodes, voids, or any resulting cell units of the microlattice. For example, in at least one embodiment, the microlattice structure may configured such that the laths form a repeating series of polygonal cell units, such as the octahedron cell units described in U.S. patent application Ser. No. 13/829,624, filed Mar. 14, 2013, the contents of which are incorporated herein by reference in their entirety.

What is claimed is:

1. An article of footwear comprising:
   an upper; and
   a sole member connected to the upper, the sole member including:
   a first lattice structure including a first network of struts and nodes with voids defined between the struts and nodes, and
   a second lattice structure including a second network of struts and nodes with voids defined between the struts and nodes, the first network of struts and nodes interwoven with the second network of struts and nodes such that the first network of struts and nodes extends through the voids in the second network of struts and nodes.

2. The article of footwear of claim 1 wherein each node is defined by at least two struts extending from said node, and wherein the first network of struts and nodes is independent of and disengaged from the second network of struts and nodes such that the first network of struts and nodes does not contact the second network of struts and nodes in the sole member.

3. The article of footwear of claim 2 wherein the first network of struts and nodes is interlocked with the second network of struts and nodes.

4. The article of footwear of claim 2 wherein the sole member further comprises a first plate, the first lattice structure connected to the first plate and the second lattice structure connected to the first plate.

5. The article of footwear of claim 4 wherein the first lattice structure, second lattice structure and the first plate are provided as a monolithic unitary construction.

6. The article of footwear of claim 1 wherein the sole member is a midsole and an outsole is connected to the midsole.

7. The article of footwear of claim 6 wherein the first lattice structure and the second lattice structure extend from a heel region of the midsole to a midfoot region of the midsole without extending to a forefoot region of the midsole.

8. The article of footwear of claim 1 wherein the struts in the first network of struts and nodes are configured as parallel wave structures in multiple layers, wherein the parallel wave structures in a first layer are transverse to the parallel wave structures in a second layer.

9. The article of footwear of claim 8 wherein the second network of struts and nodes is identical in configuration to the first network of struts and nodes.

10. The article of footwear of claim 1 wherein the sole member comprises an upper shelf and a lower platform and the first lattice structure and the second lattice structure are connected to and extend between the upper shelf and the lower platform.

11. A cushioning member comprising:
a first lattice structure including a first network of struts and nodes with voids defined between the struts and nodes, and
a second lattice structure including a second network of struts and nodes with voids defined between the struts and nodes, the first network of struts and nodes interwoven with the second network of struts and nodes such that the first network of struts and nodes extends through the voids in the second network of struts and nodes.

12. The cushioning member of claim 11 wherein each node is defined by at least two struts extending from said node, and wherein the first network of struts and nodes is independent of and disengaged from the second network of struts and nodes such that the first network of struts and nodes does not contact the second network of struts and nodes.

13. The cushioning member of claim 12 wherein the first network of struts and nodes is interlocked with the second network of struts and nodes.

14. The cushioning member of claim 12 further comprising an upper shelf and a lower platform, the first lattice structure and the second lattice structure connected to and extending between the upper shelf and the lower platform.

15. The cushioning member of claim 14 wherein the first lattice structure, second lattice structure and the plate member are provided as a unitary construction.

16. The cushioning member of claim 11 wherein the cushioning member is provided on an article of apparel.

17. The cushioning member of claim 16 wherein the article of apparel is an article of footwear and wherein the cushioning member is provided as a midsole of the article of footwear.

18. The cushioning member of claim 11 wherein the struts in the first network of struts and nodes are configured as parallel wave structures in multiple layers, wherein the parallel wave structures in a first layer are transverse to the parallel wave structures in a second layer.

19. A method of manufacturing a cushioning member, the method comprising:
printing a first lattice structure including a first network of struts and nodes with voids formed between the struts and nodes; and
simultaneous with printing the first lattice structure, printing a second lattice structure including a second network of struts and nodes with voids formed between the struts and nodes, the first network of struts and nodes interwoven with the second network of struts and nodes such that the first network of struts and nodes extends through the voids in the second network of struts and nodes.

20. The method of manufacturing a cushioning member of claim 19, the method further comprising printing a platform with the first lattice structure and the second lattice structure both connected to the platform, wherein each node is defined by at least two struts extending from said node, and wherein the first network of struts and nodes is independent of and disengaged from the second network of struts and nodes.

* * * * *